(12) United States Patent
Solheim

(10) Patent No.: US 8,970,056 B2
(45) Date of Patent: Mar. 3, 2015

(54) OCEAN WAVE ENERGY SYSTEM

(75) Inventor: Geir Arne Solheim, Måløy (NO)

(73) Assignee: Havkraft AS, Deknepollen Maloy (NO)

( * ) Notice: Subject to any disclaimer, the term of this patent is extended or adjusted under 35 U.S.C. 154(b) by 70 days.

(21) Appl. No.: 13/806,263

(22) PCT Filed: Jun. 17, 2011

(86) PCT No.: PCT/NO2011/000175
§ 371 (c)(1),
(2), (4) Date: Dec. 21, 2012

(87) PCT Pub. No.: WO2011/162615
PCT Pub. Date: Dec. 29, 2011

(65) Prior Publication Data
US 2013/0099496 A1   Apr. 25, 2013

(30) Foreign Application Priority Data

Jun. 23, 2010  (GB) .................................. 1010631.8
Jun. 23, 2010  (NO) .................................. 20100906
Mar. 30, 2011  (NO) .................................. 20110487

(51) Int. Cl.
| | |
|---|---|
| F03D 9/00 | (2006.01) |
| H01P 9/04 | (2006.01) |
| B63B 21/50 | (2006.01) |
| F03D 7/02 | (2006.01) |
| F03B 13/14 | (2006.01) |
| F03B 13/24 | (2006.01) |
| A01K 61/00 | (2006.01) |

(52) U.S. Cl.
CPC .............. *F03D 9/002* (2013.01); *B63B 21/50* (2013.01); *F03D 7/0224* (2013.01);
(Continued)

(58) Field of Classification Search
CPC .......... F03B 13/14; F03B 13/24; F03B 13/10; F03B 13/142; E02B 9/08; Y02E 10/38; Y02E 10/28; Y02E 10/32; F03D 9/002; F03D 7/0224; B63B 21/50; A01K 1/007; F05B 2210/404; F05B 2220/7068; F05B 2240/13; F05B 2250/314
USPC .............. 290/44, 42, 43, 53, 54, 55; 137/237; 405/205; 114/294
See application file for complete search history.

(56) References Cited

U.S. PATENT DOCUMENTS 3,934,528 A * 1/1976 Horton et al. .................. 114/296
5,577,882 A * 11/1996 Istorik et al. .................. 415/53.1
(Continued)

FOREIGN PATENT DOCUMENTS

| GB | 2325964 A | 12/1998 |
|---|---|---|
| GB | 2 359 859 A | 9/2001 |

(Continued)

OTHER PUBLICATIONS

English Translation of NO327593B1.

*Primary Examiner* — Javaid Nasri
(74) *Attorney, Agent, or Firm* — Basck Ltd

(57) ABSTRACT

An ocean wave energy system for generating power from ocean waves includes a platform supporting an array of hollow columns whose respective lower ends are in fluidic communication with ocean waves and whose respective upper ends are in air communication with a turbine arrangement such that wave motion occurring at the lower ends is operable to cause air movement within the columns for propelling the turbine arrangement to generate power output. The system further includes one or more position-adjustable and/or angle-adjustable submerged structures near the lower ends of the columns for forming ocean waves propagating in operation towards the lower ends of the columns to couple the waves in a controllable manner into the hollow columns.

26 Claims, 21 Drawing Sheets

(52) U.S. Cl.
CPC ............ *F03B 13/142* (2013.01); *F03B 13/24* (2013.01); *A01K 61/007* (2013.01); *Y02E 10/38* (2013.01); *F05B 2210/18* (2013.01); *F05B 2210/404* (2013.01); *F05B 2220/7068* (2013.01); *F05B 2240/13* (2013.01); *F05B 2250/314* (2013.01); *Y02E 10/32* (2013.01)
USPC .......................................................... 290/44

(56)  References Cited

U.S. PATENT DOCUMENTS

| | | | | |
|---|---|---|---|---|
| 5,642,984 | A | * | 7/1997 | Gorlov .......................... 416/176 |
| 7,752,989 | B2 | * | 7/2010 | Paz et al. ...................... 114/295 |
| 2010/0209236 | A1 | * | 8/2010 | Freeman et al. ............ 415/208.1 |

FOREIGN PATENT DOCUMENTS

| | | |
|---|---|---|
| GB | 2 411 928 A | 9/2005 |
| JP | 57 171080 A | 10/1982 |
| NO | 327593 B1 | 12/2009 |
| WO | 87/03045 A1 | 5/1987 |
| WO | 00/71891 A1 | 11/2000 |
| WO | 00/71892 A1 | 11/2000 |
| WO | 2007/057013 A1 | 5/2007 |
| WO | 2009/067023 A1 | 5/2009 |
| WO | 2009/131459 A2 | 10/2009 |
| WO | 2010/022474 A1 | 3/2010 |
| WO | 2011162615 A2 | 12/2011 |

* cited by examiner

OCEAN WAVE ENERGY SYSTEM

FIELD OF THE INVENTION

The present invention relates to ocean wave energy systems for generating energy from ocean wave motion, wherein the systems include one or more hollow tubes disposed at one or more non-vertical angles for receiving ocean waves at their one or more lower open ends, wherein the ocean waves are operable to compress in a cyclical manner fluid within the one or more hollow tubes for power generation purposes, and wherein the one or more hollow tubes are adapted so that their natural resonant frequency of wave motion therein is substantially equal in operation to a frequency of ocean waves received at the lower ends of the one or more hollow tubes for achieving enhanced energy conversion efficiency, for example by inclining and thereby changing hydrodynamic mass and stiffness of the one or more hollow tubes for modifying their natural resonant frequencies. Moreover, the present invention also relates to ocean wave energy systems for generating energy from ocean wave motion, wherein the systems include submerged structures, for example planar elements, for providing improved matching of received ocean waves to one or more hollow tubes of the systems disposed at one or more non-vertical angles for receiving ocean waves at their lower open ends, wherein the ocean waves are operable to compress fluid in a cyclical manner within the one or more hollow tubes for power generation purposes. Moreover, the present invention also concerns methods of using such systems for generating energy from ocean wave motion, wherein the methods optionally concern substantially matching in operation natural resonant frequencies of wave motion within one or more hollow tubes of the systems to one or more frequencies of ocean waves received at one or more lower ends of the one or more hollow tubes. Moreover, the present invention also concerns methods of using such systems for generating energy from ocean wave motion, wherein the method concerns adjusting the submerged structures for providing an enhanced matching between received ocean waves and energy collection arrangements included within the systems. Furthermore, the present invention also relates to structures including, for example, one or more planar elements which are submerged in operation and which provide an enhanced matching between received ocean waves and energy collection devices. Additionally, the present invention is also concerned with fluid valves for use in aforesaid ocean wave energy systems for controlling fluid flow to and/or from the one or more hollow tubes during power generation. Yet additionally, the present invention is concerned with turbine arrangements for use in systems pursuant to the present invention.

BACKGROUND OF THE INVENTION

Ocean waves are generated in an ocean region by wind acting upon an upper surface of the ocean region. Wind is itself caused by spatial differences in atmospheric temperature as a consequence of solar radiation being absorbed at the Earth. Ocean waves are effectively surface waves which are devoid of any general overall flow of ocean water, but merely an oscillatory motion of water about a mean position. Energy content of ocean waves reduces exponentially with depth from an upper ocean surface at a rate depending upon ocean wave wavelength. In a similar manner to other types of waves, for example electromagnetic waves, ocean waves can be reflected, diffracted, refracted and absorbed.

Renewable energy systems adapted for generating energy from ocean waves have to contend with numerous technical challenges. For example, ocean water is corrosive. Moreover, ocean waves vary greatly in amplitude, wavelength and complexity with time. Ocean wave energy can often be an order of magnitude greater under storm conditions in comparison to normal conditions. Moreover, situations can arise wherein ocean wave energy is negligible. Additionally, designers of ocean wave energy systems have to consider commercial viability of such systems in comparison to alternative systems such as wind turbine power generation systems, hydroelectric power systems, tidal power generation systems, fossil fuel burning power generation systems and nuclear power systems; many renewable energy systems suffer a problem of requiring costly robust structures, for example to withstand storm conditions, whilst generating relatively modest amounts of power when in operation in comparison to a corresponding size of a nuclear power station or fossil fuel power station. Thus, in order to improve commercial viability of ocean wave energy systems, it is highly desirable to ensure that such systems are designed and implemented to exhibit an enhanced operating efficiency for converting energy of ocean waves to electrical energy or similar alternative useful types of energy whilst simultaneously exhibiting sufficient robustness to survive storm conditions.

Many systems have been proposed for extracting useful energy from waves, for example using configurations of floats moving with ocean waves and coupled to pump hydraulic fluids to generate electrical power, ramps for receiving waves with upper overflow ridges for the waves to flow over to be collected to drive a turbine and vertical oscillating columns wherein ocean waves periodically compress air in the columns for actuating an air turbine for generating electricity. In a published Norwegian patent no. NO 327593 attributed to Geir Arne Solheim, there is described an air column 10 disposed in operation at an oblique angle α relative to a general surface plane 20 of an ocean environment 30, as shown in FIG. 1. A first end of the column 10 is arranged to receive waves 40 in operation. A second end of the column 10 is coupled via air valves to an air turbine 50 for generating electricity. The angle α is beneficially in a range of 10° to 35°. Although the air column 10 disposed at the oblique angle α provides a considerable improvement in operating efficiency in comparison to early vertical oscillating air columns for generation of electrical power from ocean waves, it is desirable to improve further operating efficiency of an arrangement as illustrated in FIG. 1 for ensuring its commercial competitiveness against other sources of energy, for example fossil fuels and nuclear power systems.

SUMMARY OF THE INVENTION

The present invention seeks to further improve the efficiency of ocean wave energy systems utilizing oscillating air columns.

The present invention seeks to further improve the efficiency of ocean wave energy systems utilizing oscillating air columns tuned to a period of received ocean waves thereat by using an inclination angle of the oscillating air columns to adjust natural periods in responses provided by the columns when in operation.

According to a first aspect of the invention, there is provided an ocean wave energy system for generating power from ocean waves, wherein the system includes a platform supporting an array of hollow columns whose respective lower ends are in fluidic communication with ocean waves and whose respective upper ends are in air communication with a turbine arrangement such that wave motion occurring at the lower ends is operable to cause air movement within the columns for propelling the turbine arrangement to generate power output, wherein in that the hollow columns are deployed in a non-vertical orientation, and at least a portion of the hollow columns are arranged in operation to exhibit a natural frequency of wave motion therein which is substantially matched to a frequency of ocean waves received at the portion of the hollow columns, wherein the system further comprises at least one fluid valve having a plurality of mutually abutting components each including one or more apertures, and wherein the components are moveable between a first state wherein the one or more apertures are mutually non-aligned for preventing fluid flow through the valve, and a second state wherein the one or more apertures are mutually aligned for enabling fluid flow through the valve.

The invention is of advantage in that tuning of the system enables the system to convert ocean wave energy to useable energy in a more efficient manner.

Optionally, the ocean wave energy system is implemented so that the hollow columns are implemented so that their natural frequency of wave motion therein is actively tuneable.

Optionally, the ocean wave energy system is implemented so that the array of hollow columns are disposed with their elongate axes at an oblique angle in a range of 10° to 90°, and more preferable in a range of 25° to 75° relative to an average level of an upper surface of an ocean environment in which the system is located in operation. Alternatively, the ocean wave energy system is implemented so that the array of hollow columns are disposed with their elongate axes at an oblique angle in a range of 10° to 35° relative to an average level of an upper surface of an ocean environment in which the system is located in operation.

Optionally, the ocean wave energy system is implemented so that the array of hollow columns include hollow columns having mutually different natural resonant frequencies in respect of wave motion therein for selectively matching to different frequencies of waves received from an ocean environment.

Optionally, the ocean wave energy system is implemented so that the turbine arrangement includes at least one turbine operable to rotate about a substantially vertical axis in operation for gyroscopically stabilizing the platform when operating in an ocean environment.

Optionally, the ocean wave energy system is implemented to include one or more wind turbines mounted upon the platform for generating power from wind received at the system. More optionally, the ocean wave energy system is implemented so that the one or more wind turbines are mounted at least at spatial extremes of the platform. More optionally, the ocean wave energy system is implemented so that the one or more wind turbines include one or more vertical-axis wind turbines, for example Darrieus-type vertical-axis wind turbines. Such Darrieus-type turbines are beneficial in that their rotation in operation is susceptible to assist to stabilize the platform by way of Coriolis forces.

Optionally, the ocean wave energy system is implemented to include one or more aquaculture facilities. More optionally, the one or more aquaculture facilities are adapted to be submergible in an ocean environment in response to changes in weather conditions experienced by the system in operation.

According to a second aspect of the present invention, there is provided an ocean wave energy system for generating power from ocean waves, wherein the system includes a platform supporting an array of hollow columns whose respective lower ends are in fluidic communication with ocean waves and whose respective upper ends are in air communication with a turbine arrangement such that wave motion occurring at the lower ends is operable to cause air movement within the columns for propelling the turbine arrangement to generate power output, wherein in that the system further includes one or more position-adjustable and/or angle-adjustable submerged structures near the lower ends of the columns for forming ocean waves propagating in operation towards the lower ends of the columns to couple the waves in a controllable manner into the hollow columns, and wherein the submerged structures are implemented as one or more planar structures provided with an actuator arrangement for displacing and/or tilting the one or more planar structures relative to the array of columns.

The invention is of advantage in that the one or more submerged structures are capable of improving ocean wave coupling to the array of columns, thereby enabling a greater portion of wave energy to be converted to output power from the system in operation.

In other words, the one or more submerged structures are operable to provide dynamically-adjustable wave impedance matching from an ocean environment to a local environment within the columns, namely for improving matching of ocean waves to the columns under dynamically varying wave conditions within the ocean environment.

Optionally, the ocean wave energy system is implemented so that the submerged structures are implemented as one or more planar structures provided with an actuator arrangement for displacing and/or tilting the one or more planar structures relative to the array of columns.

Optionally, the ocean wave energy system is implemented to include a sensing arrangement for determining one or more characteristics of ocean waves propagating in operation towards the columns and their associated submerged structures, and a control arrangement for receiving wave-characteristic indicative signals from the sensing arrangement and for processing the signals for regulating positions and/or angles of the submerged structures for providing a dynamically responsive control of the submerged structures. More optionally, the ocean wave energy system is implemented so that the control arrangement is implementing using computing hardware implementing at least one of:

(a) controlled adjustment of the submerged arrangement by way of employing a numerical model representative of operating properties of the system; and (b) use of a neural network whose neural weightings are adapted for controlling operation of the system in response to sensed wave conditions.

Optionally, the ocean wave energy system is implemented so that the array of hollow columns are disposed with their elongate axes at an oblique angle in a range of 10° to 35° relative to an average level of an upper surface of an ocean environment in which the system is located in operation.

Optionally, the ocean wave energy system is implemented so that the turbine arrangement includes at least one turbine operable to rotate about a substantially vertical axis in operation for gyroscopically stabilizing the platform when operating in an ocean environment. Such gyroscopic stabilization utilizes Coriolis forces.

Optionally, the ocean wave energy system is implemented so that the platform is adapted to be rotatable in operation to enable the array of columns to be orientated in respect of ocean waves received at the system.

Optionally, the ocean wave energy system is implemented to include aquaculture facilities adapted to be submerged for protection substantially beneath the system in adverse weather conditions which could damage the aquaculture facilities.

Optionally, there is provided a method of operating an ocean wave energy system pursuant to the first and/or second aspect of the invention, wherein the method includes:
(a) receiving one or more ocean waves in a vicinity of the one or more submerged structures for adjustably influencing an energy field of the one or more waves to form the one or more waves for being received at an array of air columns of the system; and
(b) receiving the one or more waves at the array of columns for periodically compressing and/or rarefying air in the one or more columns for driving a turbine arrangement for generating power,
wherein the submerged structures are implemented as one or more planar structures provided with an actuator arrangement for displacing and/or tilting the one or more planar structures relative to the array of columns.

According to a third aspect of the present invention, there is provided a method of controlling an ocean wave energy system pursuant to the first aspect of the invention, wherein the method includes:
(i) sensing one or more characteristics of ocean waves approaching the ocean wave energy system to generate corresponding sensor signals;
(ii) processing the sensor signals in a processing arrangement to generate corresponding control signals; and
(iii) applying the signals to actuators coupled to one or more position-adjustable and/or angle-adjustable submerged structures near lower ends of columns of the system for forming the sensed ocean waves propagating in operation towards the lower ends of the columns to couple the waves in a controllable manner into the hollow columns for generating corresponding output power.

Optionally, the method is implemented so that the processing arrangement is operable to apply a numerical model and/or a neural network for generating the control signals from the sensor signals.

Optionally, the method includes:
(iv) sensing a propagating direction of ocean waves to be received at the array of columns; and
(v) rotatably orientating the array of columns relative to the propagating direction of the ocean waves.

Optionally, the fluid valve for use with one or more columns of an ocean wave energy system pursuant to the first aspect and/or second aspect of the present invention, wherein
(i) movement of the components is operable to provide the fluid valve with a self-cleaning function for preventing marine growth upon the components; and
(ii) interfacing surfaces between the components are arranged to be a water-lubricated electrostatic bearing by way of one of the interfacing surfaces being hydrophobic in nature abutting onto a corresponding interfacing surface being hydrophilic in nature.

Optionally, the turbine arrangement for use with an ocean wave energy system pursuant to the first and/or second aspect of the invention, wherein the turbine is operable to perform unidirectional rotation in response to bidirectional fluid flow therethrough, wherein in that the turbine arrangement includes a plurality of radial turbine components which are each provided with a corresponding energy pickoff arrangement, and a plurality of vane elements coupling between the plurality of radial turbine components and/or mounted upon an arrangement coupling between the plurality of radial turbine components, wherein a relative rotation angle between the plurality of radial turbine components is operable to control pitch angles of the plurality of vane elements for adapting the turbine arrangement to maintain a unidirectional rotation direction in response to bidirectional fluid flow therethrough.

Optionally, the turbine arrangement includes an electronic control arrangement for selectively applying drag or torque to the plurality of radial turbine components for adjusting the pitch angles of the plurality of vane elements.

Features of the invention are susceptible to being combined in various combinations within the scope of the invention as defined by the appended claims.

DESCRIPTION OF THE DIAGRAMS

Embodiments of the present invention will now be described, by way of example only, with reference to the following diagrams, wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In respect of describing embodiments of the present invention, contents of the aforementioned Norwegian patent no. NO 327593 (inventor: Geir Arne Solheim) are hereby incorporated by reference.

Figure 2:
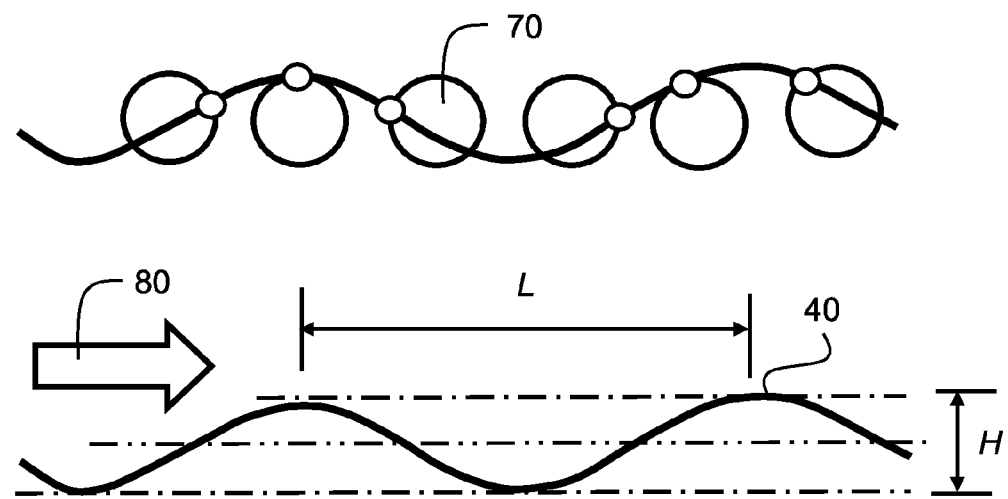
FIG. 2 is an illustration of circular ocean water movement associated with ocean surface waves propagating within an ocean environment.

In order to further elucidate the present invention, some basic principles regarding ocean wave energy and ocean wave propagation characteristics will now be described. When an ocean wave 40 propagates, it corresponds to an energy flow; substantially circular cyclical water movement as denoted by 70 occurs as energy embodied in the ocean wave 40 propagates as illustrated in FIG. 2. A propagation direction of the wave 40 is denoted by an arrow 80. The wave 40 has a spatial wavelength of L and a trough-to-peak amplitude of H.

When the wave 40 propagates with a velocity c, a frequency f of the wave 40 is defined by Equation 1 (Eq. 1):

$$f = \frac{c}{L} \qquad \text{Eq. 1}$$

On account of oceans of Earth not having any preferred frequency for ocean wave propagation, namely no preferred resonant frequency characteristic, ocean waves are susceptible to occur over a wide range of frequencies f and amplitudes H. Moreover, on account of wave generation phenomena occurring simultaneously at various spatial locations, ocean wave motion is a superposition of many sinusoidal wave groups. A phenomenon of waves breaking on a beach is non-representative of a complex superposition of various waves groups as observed off-shore in deep waters.

Figure 3:
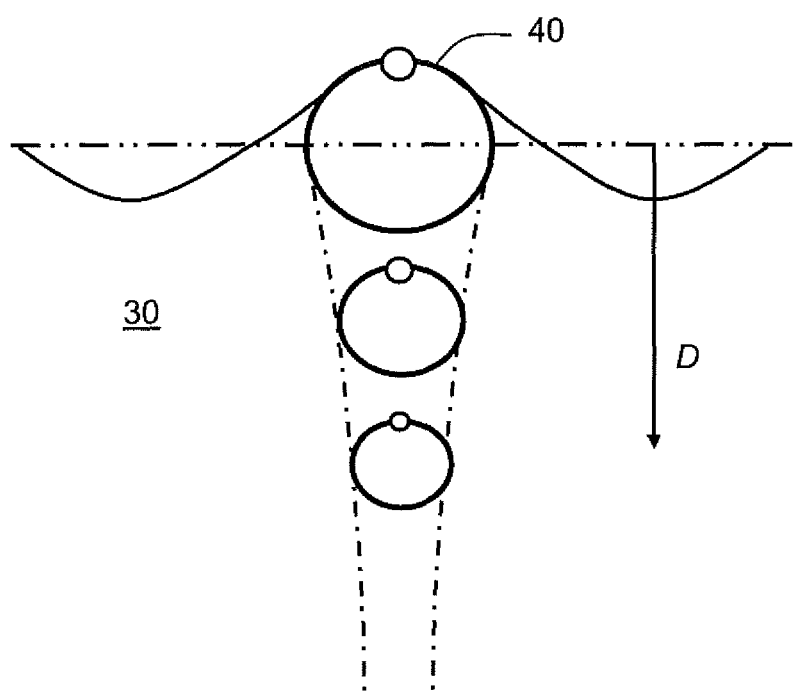
FIG. 3 is an illustration of circular ocean water movement associated with ocean surface wave propagation, wherein the illustration depicts diminishing cyclical water movement as a function of depth D into the ocean environment.

Ocean waves which are generated by wind interactions with an ocean surface are known as "wind waves". When these wind waves have propagated from a spatial region in which they were created, they are then known as "swells". These swells exhibit a characteristic in that they are capable of propagating relatively large distances, for example across the Pacific Ocean with relatively little energy loss, almost in a manner akin to a soliton wave. A reason for such little loss is that ocean swell waves are essentially surface waves in a relatively incompressible viscous medium of ocean water. Circular water motion associated with a propagating ocean wave reduces substantially exponentially with depth D as illustrated in FIG. 3; for example, at a depth of D=L, most of circular water motion associated with a surface ocean wave is diminished. On account of such a diminishing characteristic with depth D, submarines travelling submerged are often unaffected by severe storms raging at an ocean surface above them.

Energy content of ocean waves is calculable from Equation 2 (Eq. 2):

$$E = k_E H^2 \qquad \text{Eq. 2}$$

wherein
E=ocean wave energy content;
$k_E$=a constant equal to ρg, wherein ρ is a density of salty ocean water of 1020 kg/m³, and g is a gravitational constant of 9.8 m/s²; and
H=ocean wave vertical amplitude as defined earlier with reference FIG. 2.

For example, an ocean wave having an amplitude H=2 meters has an energy content of 5 kJ/m². A rate of energy transport J in ocean waves is calculable then from Equation 3 (Eq. 3):

$$J = c_g E \qquad \text{Eq. 3}$$

wherein
$c_g$=group velocity calculable from $c_g = gT/4\pi$ wherein T=L/c for deep ocean water;
E=ocean wave energy content as calculable from Equation 2 (Eq. 2); and
J=energy flow;
wherefrom Equation 3 (Eq. 3) is susceptible to being re-expressed as Equation 4 (Eq. 4):

$$J = k_f T H^2 \qquad \text{Eq. 4}$$

wherein
$k_f = \rho g^2$, namely approximately 1 kW/m³s

For example, an ocean wave 40 exhibiting a period T=10 seconds and an amplitude of 2 meters has associated therewith an energy flow of 40 kW/m which represents considerable power.

In practice, ocean waves are a complex superposition of a plurality of propagating individual waves. Such superposition seems poorly appreciated in earlier patent literature concerning ocean wave energy systems. The plurality of propagating individual waves are susceptible to having a spectrum of wavelengths L and heights H; in practice, the wavelengths are mostly included in a range of $L_{min}$ to $L_{max}$, and the height H is included in a range of 0 meters to $H_{max}$. In consequence, movement of an ocean surface at a given spatial position can often be found to vary considerably such that the height H can superficially to an observer appear highly variable as a function of time t, namely in a seemingly random manner. If an ocean wave spectrum is represented by a function S(f), an effective wave height as observed by an observer at a given position in an ocean is given by Equation 5 (Eq. 5):

$$E = \rho g \int_0^\infty S(f)\,df = \frac{\rho g H_g^2}{16} \qquad \text{Eq. 5}$$

wherein
$H_g$=group wave height.

Although Equation 4 (Eq. 4) describes a theoretical expected ocean wave energy transport J, an energy transport rate observed in practice is approximately half this value when spectral superposition of many ocean waves of diverse spectral characteristics are taken into consideration.

Figure 4A:
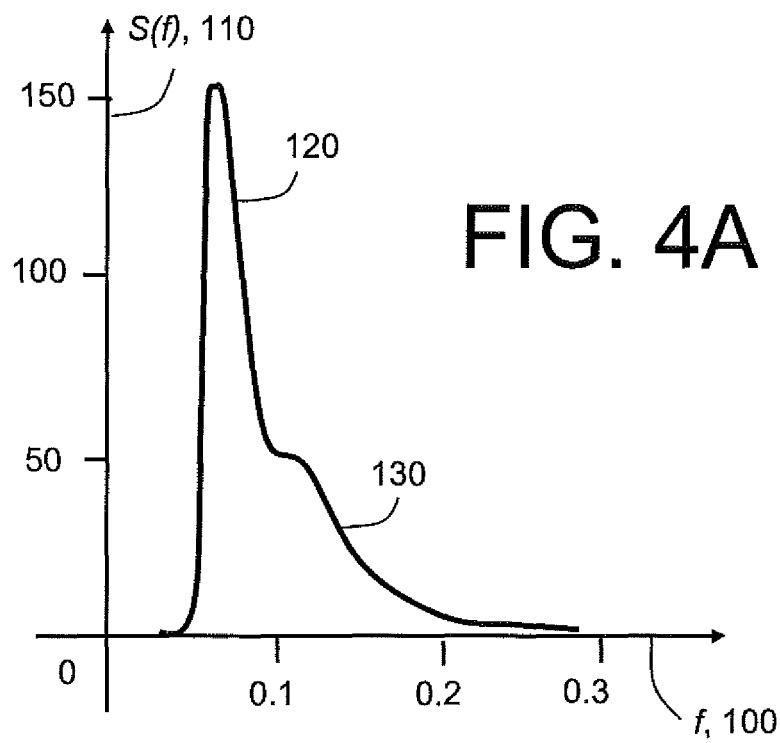
FIG. 4A and FIG. 4B are example graphs illustrating various wave energy densities as a function of wave frequency in an ocean environment.

When measurements are made regarding ocean wave spectra, a characteristic graph as illustrated in FIG. 4A is observed for windy ocean weather. The graph of FIG. 4A includes an abscissa axis 100 corresponding to wave frequency, and an ordinate axis 110 describing a corresponding function in Equation 5 (Eq. 5). Moreover, the graph of FIG. 4A illustrates a lower wave frequency of 0.05 Hz and an upper wave frequency of substantially 0.25 Hz. Furthermore, the graph of FIG. 4A includes a maximum peak 120 at a frequency of 0.08 Hz corresponding to swells with a tail characteristic 130 substantially between 0.1 Hz and 0.2 Hz. For most efficiently collecting ocean wave energy, an ocean wave energy system is required to be responsive in a frequency range including substantially two octaves. Contemporary ocean wave energy systems often do not have a response characteristic which can efficiently cope with such a large wave frequency range.

Figure 4B:
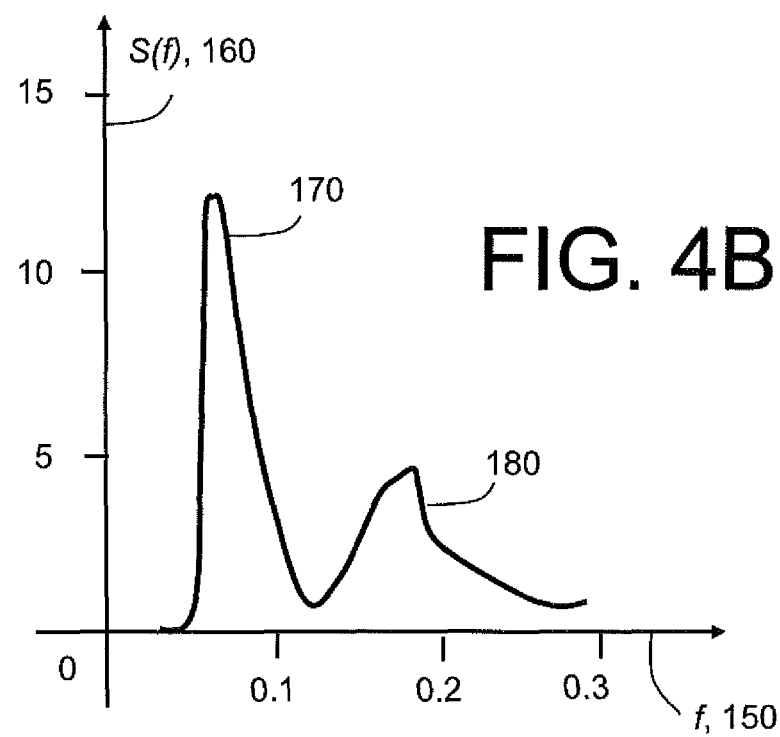

In FIG. 4B, there is shown a graph regarding ocean wave spectra for a mixture of windy sea and swells. In the graph of FIG. 4B, there is an abscissa axis 150 corresponding to wave frequency f, and an ordinate axis 160 representing the aforementioned function S(f) of Equation 5 (Eq. 5). There is a lower wave frequency of 0.05 Hz and a maximum upper wave frequency of substantially 0.35 Hz. There are shown two distinct peaks, namely a first peak 170 centred around 0.08 Hz corresponding to swells, and a second peak 180 centred around 0.19 Hz corresponding to wind-excited waves. FIG. 4B corresponds to an ocean wave frequency range of substantially two octaves, namely nearly an order of magnitude. Although most energy is conveyed by way of swells, FIG. 4B illustrates that very significant energy is included at higher frequencies in the form of wind-induced waves.

Figure 5:
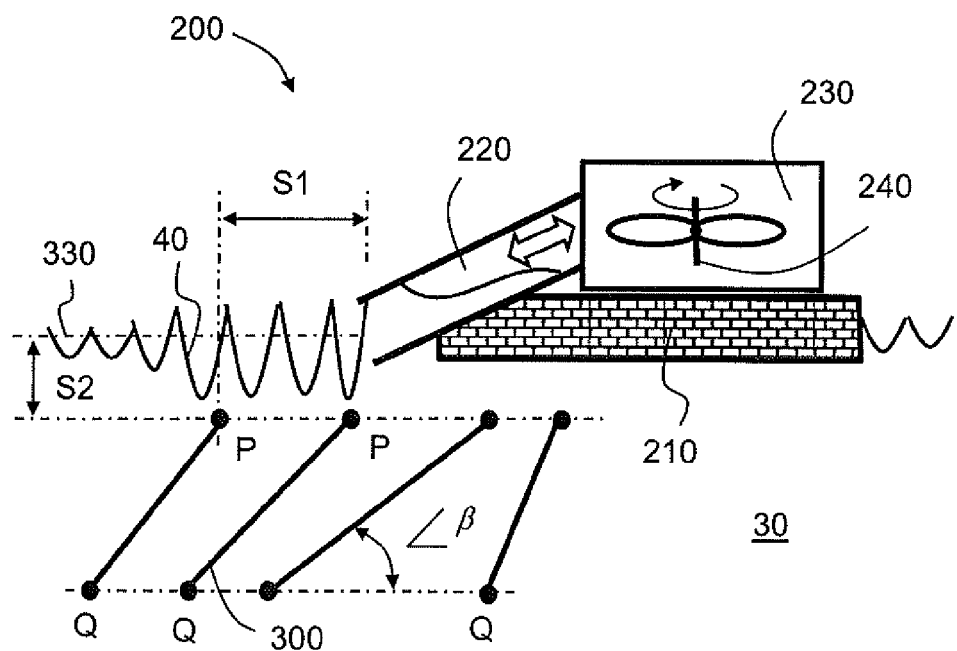
FIG. 5 is a schematic illustration of a wave reflector ocean wave system (WARE) pursuant to the present invention.

Referring to FIG. 5, there is shown an example of an ocean wave system pursuant to the present invention; the system is generally indicated by 200. The system 200 is susceptible to being deployed along coastlines, deployed as floating islands off-shore, deployed as peninsula, and/or disposed as floating bridges for coupling landmasses together and for synergistically also generating power. Moreover, the system 200 comprises at least one floating, sea-bed supported or coastal-supported platform 210 bearing one or more obliquely-orientated air columns 220 in a manner akin to columns described in aforementioned patent no. NO 327593 (inventor: Geir Arne Solheim) hereby incorporated by reference. The one or more air columns 220 operate in a similar manner to those described in patent no. NO 327593, namely ocean waves 40 interact with lower ends of the one or more air columns 220 to compress and rarefy air cyclically in upper ends of the one or more columns 220. Moreover, the one or more air columns 220 are coupled at their upper ends in air communication to one or more large-diameter air-propelled turbines 230. Optionally, the one or more turbines 230 are orientated with their one or more axes of rotation 240 disposed in operation in a vertical direction as illustrated. At a front peripheral edge of the platform 210 is included, in operation in a submerged state, at least one underwater planar baffle 300 as illustrated in FIG. 5. Optionally, the planar baffle 300 is in substantially tilted orientation as illustrated, namely subtending an angle fi relative to a nominal surface plane of the ocean 30. As an alternative, or addition, to utilizing the baffle 300, other types of element can be employed, for example tubular elements, disc-like elements, spherical elements, hemispherical elements, curved elements. Beneficially, the one or more air columns 220 are tuned so that their natural resonant frequency of wave motion therein, for example a function of a diameter or cross-sectional area of the one or more columns 220, is substantially matched to a frequency of incoming ocean waves 40 received at the one or more columns 220 so that they most efficiently covert energy present in the incoming ocean waves to useable energy in the system 200. Substantial matching is, for example, to be construed to be within −6 dB points of resonance, and more preferably within −3 dB points of resonance. Optionally, the one or more columns 220 are actively tuned so that their natural frequencies of waves therein are matched in operation to incoming ocean waves 40 received thereat; such tuning is for example achieved by including actuated panel baffles within the one or more columns 220. Optionally, the one or more columns 220 are manufactured to have mutually different natural frequencies of wave motion therein, so that at least certain of the one or more columns 220 will optimally match in their tuning to the incoming ocean waves.

In operation, when the system 200 is implemented as a floating structure, the one or more turbines 230 beneficially function as gyroscopes, namely flywheels, in operation when rotating to maintain the platform 210 angularly stable, namely by way of Coriolis forces; such stability is highly beneficially to render the platform 210 robust in storm conditions as well as ensuring that lower ends of the one or more columns 220 are correctly orientated and positioned in respect of an upper surface 330 of the ocean environment 30. The planar baffle 300 serves two synergistic purposes:

(i) a first purpose is to stabilize the platform 210 in rough seas when implemented as a floating structure because at least a portion of the planar baffle 300 is substantially below an principal energy field of waves 40 propagating on the upper surface 330 of the ocean environment 30; beneficially, the planar baffle 300 is below a 25% attenuation level for a principal wavelength of waves propagating on the surface 330 of the ocean environment 30;

(ii) a second purpose is to affect at a lower spatial level an energy field of waves propagating on the surface 330 of the ocean environment 30 to cause coherence and hence a tendency for the waves to increase in height towards a breaking state, for example as occurs near a beach as water shallows; such increase in coherence resulting in greater wave amplitude greatly improves wave energy coupling into the one or more columns 220.

Optionally, the system 200 includes one or more planar baffles 300, and/or alternative elements as described in the foregoing, which are actuated for adjusting their positions relative to the platform 210 in operation as a function of ocean wave amplitude and/or principal wavelength. Ranges of adjustment for the one or more planar baffles 300 and/or alternative elements will be described in greater detail later. Beneficially, for reducing cost, principal components of the system 200, for example walls of the one or more columns 220 and of the platform 210, are constructed from reinforced marine-grade non-porous concrete, for example of a type as utilized in contemporary off-shore oil platforms. Beneficially, components parts of the system 200 are fabricated from marine-grade concrete which is cast in situ in an ocean environment, thereby avoiding a need to transport large pre-fabricated components.

Figure 6:
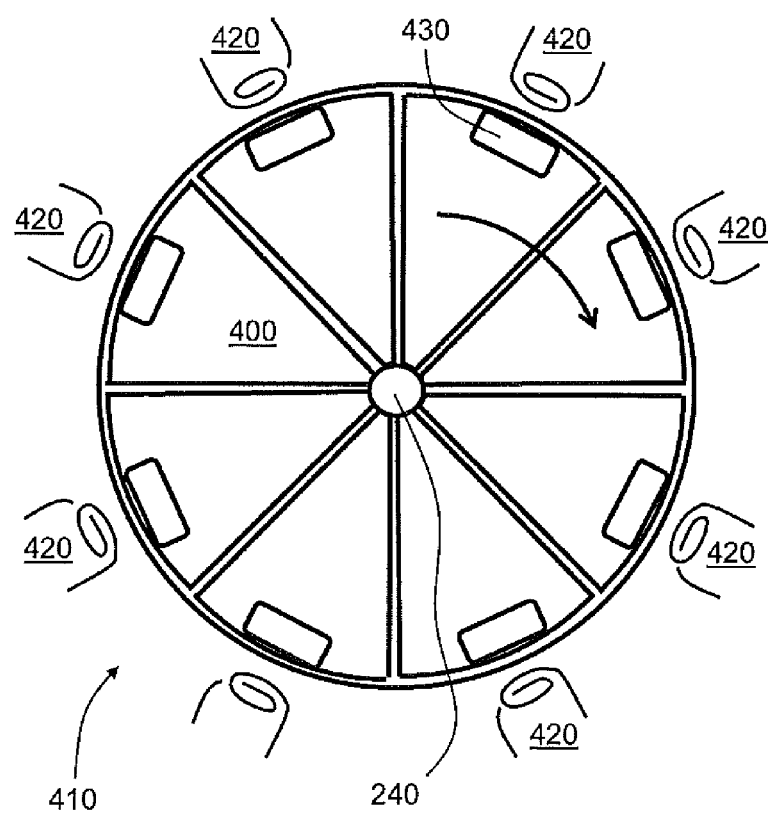
FIG. 6 is a schematic illustration of a turbine rotor of the system of FIG. 5 whose blades are equipped with peripheral magnets for inducing electrical power in stationary peripheral pickoff coils.
Figure 7:
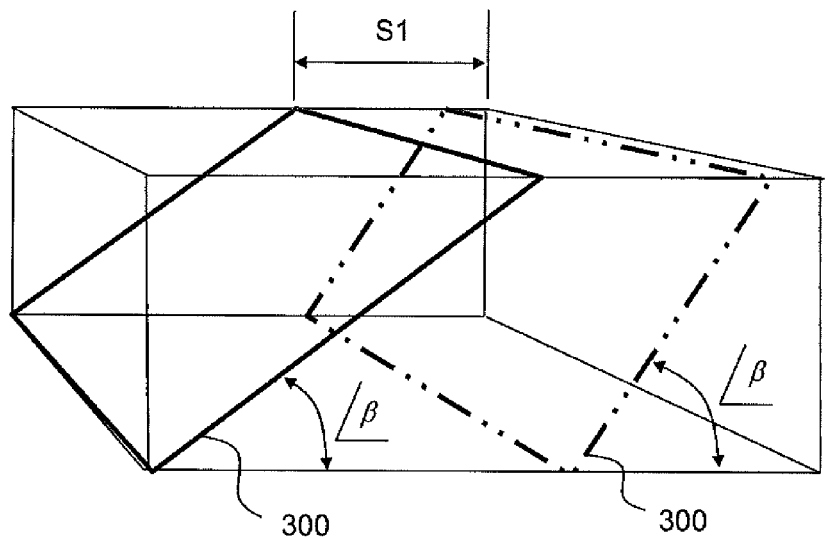
FIG. 7 is a schematic illustration of angular and/or position adjustment of a planar baffle when implementing the present invention.

The one or more turbines 230 are optionally coupled to electrical power generators for generating electricity for output from the system 200. Optionally, the one or more turbines 230 include blades 400 operated by air pressure differences thereacross to cause one or more corresponding rotors 410 of the one or more turbines 230 to rotate in operation as illustrated in FIG. 6. Beneficially, the one or more turbines 230 are implemented to include coils 420 and/or magnets 430 so that functions of turbine and generator are spatially collocated; for example, peripheral regions of the blades 400 are equipped with permanent magnets 430 which are drawn peripherally past stationary coils 420 for generating electrical output from the system 200. Such simplicity of construction of the turbines 230 is capable of providing enhanced operating reliability of the system 200 by way of fewer moving parts. Optionally, the one or more turbines 230 are supplied with compressed air via a plenum, namely an air reservoir, which is coupled via valves to a relatively large number of the columns 220, for example in excess of 20 columns, for avoiding pulsating outputs from the generator. Beneficially, wave motion within the large number of columns 220 is asynchronous to reduce a tendency to generate pulsating output from the system 200 at a frequency corresponding to wave 40 frequency. The system 200 pursuant to present invention deployed in large scale in ocean environments 30 is capable of generating electrical power at highly competitive costs, thereby potentially addressing the present World shortfall in energy associated with "peak oil", without adding to atmospheric carbon dioxide when in operation. Moreover, being an electromechanical apparatus, the system 200 is not capable of causing dangerous environmental pollution, for example as occurred in Chenrobyl (Ukraine), Three Mile Island (Harrisburg) (USA), Fukushima (Japan) and Sellafield ("Windscale") (United Kingdom). Present World power consumption from fossil fuels is estimated to be around 4 TeraWatts which can potentially, to a considerable extent, be supplied by the system 200 when deployed World-wide within ocean environments 30. Beneficially, the system 200 does not cause pollution and generates electrical energy in a completely sustainable and clean manner. When implemented in a floating manner off-shore, the system 200 is potentially capable of withstanding tsunami conditions which cause damage only when reaching a coastal region, for example as occurred at Fukushima (Japan) in the year 2011. The system 200 is thus potentially far more robust in comparison to nuclear facilities deployed at vulnerable coastal locations.

Referring again to FIG. 5, the submerged planar baffle 300 has an upper extent denoted by a point P and has a lower extent Q which is optionally at a constant distance from the point P. Optionally, an extent of the planar baffle 300 is made dynamically alterable, for example by implementing the planar baffle 300 as a set of sheets of material disposed mutually in parallel in mutual contact, and which can mutually slide to provide the baffle 300 with variable extent from the point P for providing an optimal impedance match between the columns 220 and the waves propagating within the ocean environment 30. As illustrated in FIG. 5, the baffle 300 is provided with an actuator (not shown) for varying a distance S1 of the point P with respect to a lower open end of the column 220. Moreover, an angle $\beta$ of the baffle 300 is dynamically alterable to provide best matching of waves 40 to the column 220. Furthermore, a depth S2 of the point P below the surface 330 of the ocean environment 30 is also susceptible to being altered dynamically. However, it must be appreciated that the system 200 includes several such columns 220 in a manner of a 2-dimensional array, with rows of columns 220 disposed in parallel and orthogonal to wavefronts of the waves 40. Optionally, the baffle 300 is capable of being curved in operation for providing fine tuning of the wave 40 matching to the columns 220.

Wave energy reflectors (WARE, © ™ of Havkraft AS) pursuant to the present invention will now be elucidated in further detail. WARE© ™ (Wave Reflector) is an apparatus or arrangement for reflecting wave energy upwards towards a surface region of an ocean for providing for enhanced energy pickoff performance. WARE, © ™ (Wave Reflector) is especially beneficially employed in combination with an ocean wave energy system as described in aforementioned granted patent no. NO 327593 (attributed to inventor Geir Arne Solheim). In operation, WARE© ™ (Wave Reflector) is an apparatus or arrangement which is mounted on a mooring arrangement and is disposed sub-sea directly under an ocean surface. WARE, © ™ (Wave Reflector) is a simple unitary construction with moveable parts which are manipulated by actuation to regulate a manner in which waves propagate through an ocean environment for being received by ocean wave energy systems for generation sustainable renewable energy.

WARE© ™ (Wave Reflector) is beneficially implemented as the one or more planar baffles 300 of desirable breadth whose angle $\beta$ relative to horizontal and position S1, S2 are regulated in operation by associated actuator mechanisms in a manner as illustrated in FIG. 5, and FIG. 7 to FIG. 9. Various strategies can be beneficially employed to dispose the WARE, © ™ (Wave Reflector), namely the planar baffle 300, in an optimal position and angle for enhancing power generation from ocean waves 40 achieved by the system 200.

Figure 8:
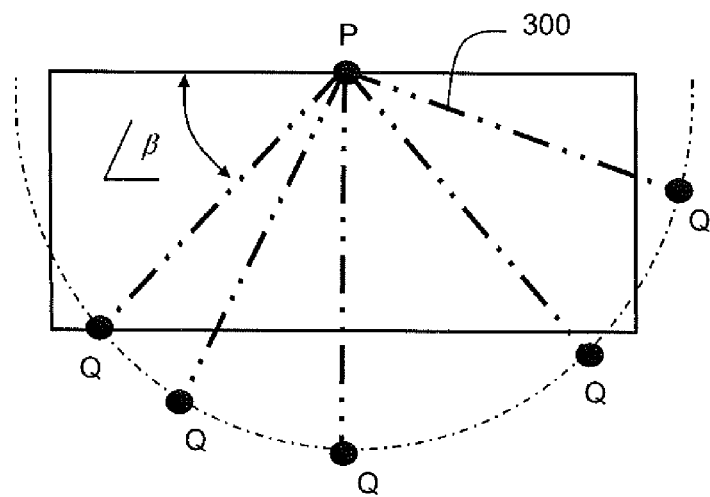
FIG. 8 is a schematic illustration of angular adjustment of a planar baffle pursuant to the present invention.
Figure 9:
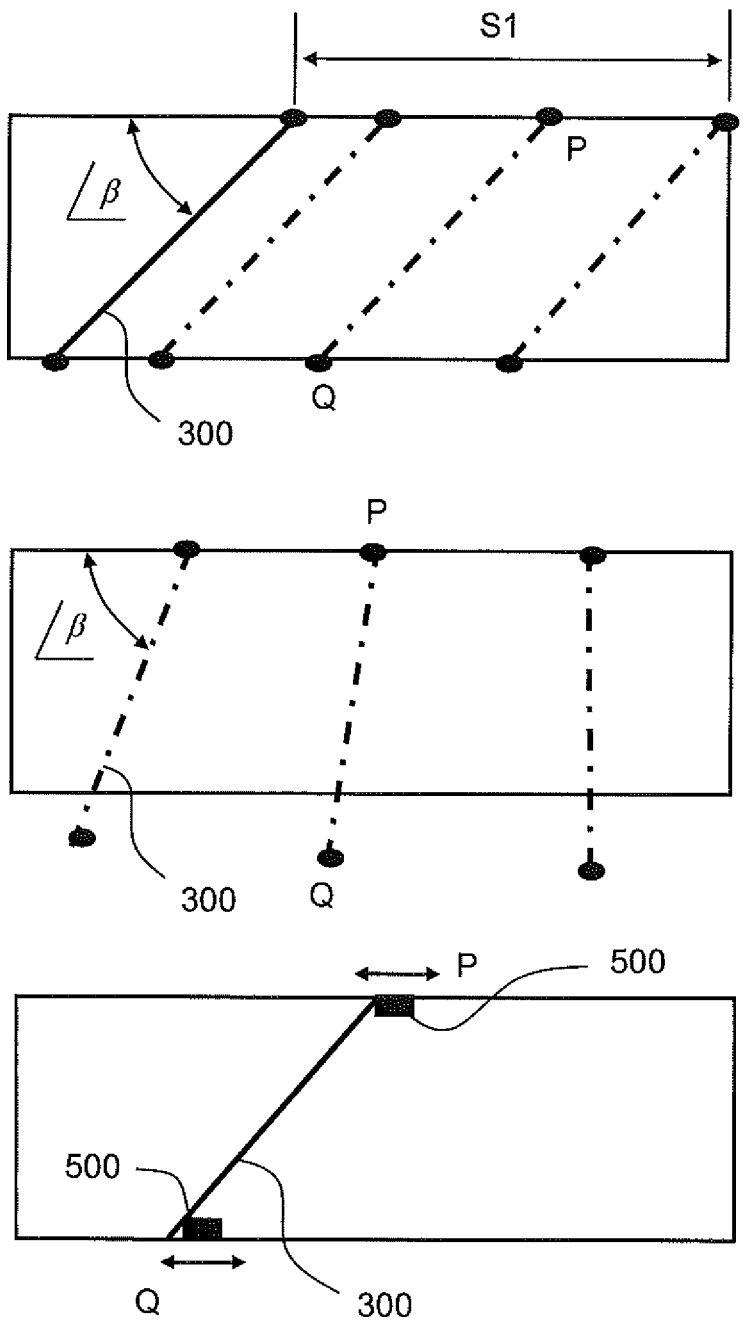
FIG. 9 is a schematic diagram of positional and angular adjustment of a planar baffle of a WARE arrangement pursuant to the present invention.

WARE, © ™ (Wave Reflector) is beneficially adjusted and steered at two points P, Q on the upper and lower portions of the baffle 300 respectively in a mutually independent manner to provide independent adjustment of a position S1 and an angle fi of the baffle 300. Optionally, a depth S2 of the baffle 300 as defined by its upper extent P is also adjustable for providing optimal matching of ocean waves to the one or more columns 220 of the system 200. WARE, © ™ (Wave Reflector) is capable of operating in a simple manner by using simple mechanisms, for example on rails with actuation force being coupled by wires and/or belts and/or chains from actuators 500 as illustrated in FIG. 9. In an optional implementation, the planar baffle 300 is attached at its upper point P, and its lower end Q is freely adjustable as illustrated in FIG. 8.

Figure 10:
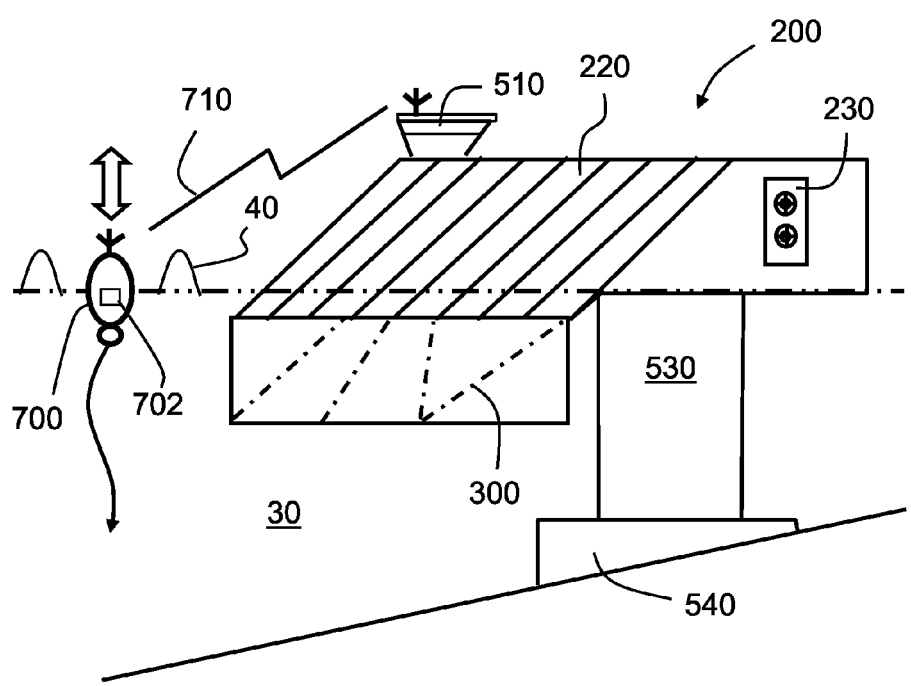
FIG. 10 is a side view illustration of an ocean wave energy system pursuant to the present invention.

Referring to FIG. 10, the system 200 is beneficially constructed onto a platform 520 supported by one or more pillars 530 onto sea-bed foundations 540; alternatively, the system 200 can be implemented as a floating structure. The system 200 includes one or more rows of columns 220 whose lower open ends face towards a spatial region in which one or more planar baffles 300 are included, wherein the one or more planar baffles 300 are actuated as aforementioned to couple ocean waves 40 most efficiently from the ocean environment 30 to the one or columns 220.

The WARE, © ™ (Wave Reflector), namely the planar baffles 300 and their associated actuator arrangements, optionally each have a spatial planar extent in a range of 10 meters×2 meters to 30 meters×8 meters. More optionally, the spatial planar extent of each baffle 300 is substantially 20 meters×5 meters. The planar baffles 300 are each adapted to a typical ocean wave 40 wavelength for being capable of considerably influencing an energy field of such waves. When the planar baffles 300 are orientated in a manner such that their major surface planes are parallel to an upper surface of the ocean environment 30, the planar baffles 300 being submerged, the ocean waves 40 are most strongly affected by the baffles 300. Conversely, when the baffles 300 are in a vertical orientation such that their major surface planes are orthogonal to the upper surface of the ocean environment 30, the ocean waves 40 are least affected. Optionally, the distance S2 can be increased to reduce an effect of the baffles 300, and reduced to enhance an effect of the baffles 300. Optionally, the baffles 300 are adjustable up to 15% of their breadth in position, namely the distances S1, S2, and can be adjusted in a range of 180°, namely the angle The WARE, © ™ (Wave Reflector) represents an innovation in respect ocean wave systems operable to extract energy from ocean waves. In use, the wave reflector implemented by way of the baffles 300 and their associate actuators and control system, is operable to provide one or more of the following functions:

(a) to provide better matching of the waves 40 to the columns 220 to pressurize air within a plenum, namely reservoir, coupled via valves to the columns 220, wherein the plenum is coupled to the turbine 230;

(b) to provide a manner of power control to cause transmission or reflection of ocean waves 40 in respect of the system 200, thereby assisting to regulate power output from the system 200 and/or to assist the system 200 to withstand severe weather conditions (for example hurricane conditions); and (c) to provide the system 200 with greater stability in adverse weather conditions when implemented as a floating structure, on account of ocean environment water in a region of the end Q being relative tranquil during storm conditions.

Wave motion at a surface of the ocean environment 30 can be complex with waves of several different wavelengths being temporally concurrently present. Moreover, ocean wave characteristics can change dynamically which would cause fluctuations in output from the system 200 were it not for the baffles 300 and their associated actuators 500 and control system 510 responding to modify the angle β and/or the distance S1 and/or the distance S2 in temporal dynamic response to changes in ocean wave conditions. Actuation of the baffles 300 is beneficially achieved by employing rails for providing adjustment of the distance S1, and by employing wires for adjusting the angle by way of the lower region Q being free to move whereas the upper region P is arranged to pivot as illustrated in FIG. 8.

The baffles 300 and their associated actuators are susceptible to being controlled in various manners during operation.

In a first method, motion of the waves 40 within the ocean environment 30 is monitored from the system 200 using optical image apparatus, for example telescopic cameras, which determines a frequency spectrum of the waves 40, for example in a similar manner as illustrated in FIG. 4A and FIG. 4B. A computer model of the system 200 then computes in real time how the system 200 will behave to the observed waves 40 approaching the system 200 for various positions of the baffles 300 disposed near open mouths of the columns 220 for providing a desired output. When an optimal position of the baffles 300 is computed, the control system then adjusts positions of the baffles 300 so that they are in an optimal position when the observed waves 40 arrive at the system 200 for coupling into the columns 220 in a desired manner. The computer model can be an explicit numerical model of the system 200. Alternatively, the computer model can be implemented as a neural network, wherein the control system has learnt by controlling operation of the system 200 and/or by simulation an optimal adjustment of the baffles 300 when the control system is presented with different views of the ocean waves 40. The control system can be implemented in electronic hardware or by employing computer software products stored on machine-readable data storage media and executing upon computing hardware. As an alternative or addition to employing an optical image apparatus, one or more monitoring buoys can be placed at a distance from the baffles 300 to sense wave spectral characteristics, the one or more buoys 700 being operable to convey their sensed data to the system 200 via a wireless communication link 710. The one or more buoys 700 are beneficially each equipped with a sensing arrange 702 (shown in FIG. 10), such as an inertial sensor unit comprising accelerators and, optionally, gyroscopic devices for enabling the one or more buoys 700 to sense wave 40 height and frequency; information describing sense waves 40 height and frequency is conveyed by wireless to the system 200 before the sensed waves 40 are received at the system 200, thereby providing an opportunity for the control system to adjust the baffles 300 to an optimal position to receive the sensed waves 40. By such a control method, it is possible to tune the system 200 dynamically in real time to provide a best performance.

In a second method, namely quasi-steady state control, the control system for the baffles 300 applies small perturbations in angle β and/or one or more of the positions S1, S2 of the baffles 300 when in operation when at least partially matching waves 40 to the columns 220. The control system, at any given point in time, determines whether or not an applied perturbation causes a further improvement in operations of the system 200, and continues to apply subsequent such small perturbations until the system 200 is operating as optimally as it is capable of functioning in any given condition of the ocean environment 30. By such a control method, it is possible to tune the system 200 dynamically in real time to provide a best performance. Optionally, a combination of the first and second methods is employed.

Optionally, the system 200 is employed both as an ocean wave power generating facility and also as a coastal erosion defence. Aquaculture facilities 800 are beneficially spatially collocated with the system 200, for example in regions of calmer water created by operation of the system 200. Such aquaculture is beneficially implemented in fish cages, such that the fish cages can be submerged in calmer deeper water substantially beneath the system 200 in an event of severe storm conditions for protection; when submerged in calmer deeper water, artificial aeration is beneficially provided to the submerged fish cages. The system 200 is of benefit in that natural fish, for example krill, will naturally seek protection in calmer water that the system 200 creates in its wake, namely in a region of ocean between the system 200 and land 600. This creates a calm environment for especially productive fishing using fish boats. The aquaculture facilities 800 also have an enormous advantage in that parasites and pollution experienced in intensive fjord-based aquaculture is less of a problem in open ocean environments. Moreover, boats beneficially moor with the system 200 when servicing the aquaculture facilities 800, thereby enhancing safety considerably in commercial fishing activities.

Figure 11:
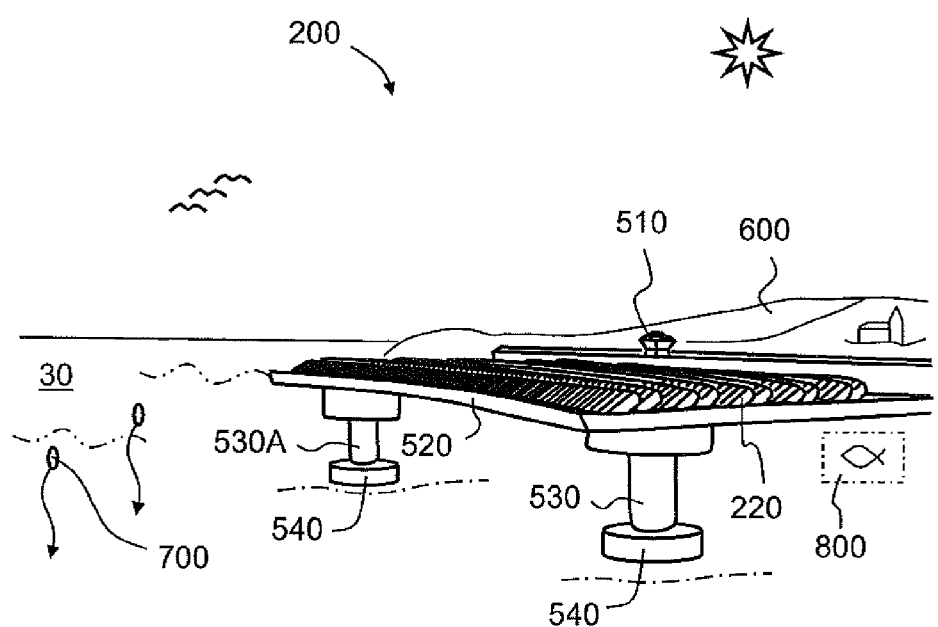
FIG. 11 is a schematic illustration of a coastal wave reflection ocean wave energy system pursuant to the present invention, wherein the system is supported by a plurality of pillars.
Figure 12:
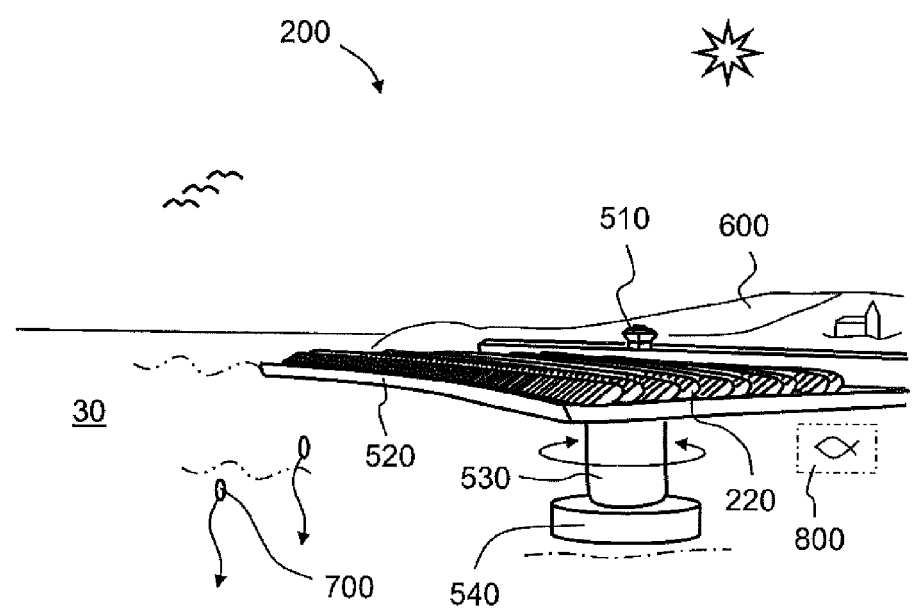
FIG. 12 is a schematic illustration of a coastal wave reflection ocean wave energy system pursuant to the present invention, wherein the system is supported by a central pillar to enable the system to rotate to adapt to waves propagating from dynamically changing directions.

It will be appreciated that the system 200 is capable of being fixedly mounted to an ocean floor, namely seabed, of the ocean environment 30, for example as illustrated in FIG. 10 and FIG. 11, or can be floating offshore and tethered via anchors to the ocean floor. The anchors are beneficially implemented by way of suction cups, sea-bed anchors fastened into bore holes pre-drilled into the ocean floor, and/or heavy hollow tanks which synergistically operationally function as compressed-air reservoirs, namely plenum, for the columns 220 to smooth out variations in compressed air flow provided from the columns 220 to enable the system 200 to deliver a more stable flow of energy. Optionally, as aforementioned, the system 200 is implemented as one or more floating island, or as a floating peninsula coupled at one end to land for coupling electrical cables from the generators 230 to land 600. Optionally, for example as illustrated in FIG. 12, the system 200 can be implemented such that it is able to rotate about a single pillar 530 and associated foundation 530, thereby enabling the system 200 to adjust dynamically to changing wave 40 propagation directions; in such case, the system 200 is provided with an appropriate rotation control arrangement and rotation actuators, and the system 200 is equipped with sensors, for example optical imaging sensors, for determining prevailing instantaneous wave propagating direction. As an alternative or addition to employing the electrical cables from the generators 230 to land 600, the system 200 is beneficially operable to electrolyse sea water to generate Hydrogen as fuel which is piped to land 600 or periodically transported to land by boat; internal combustion engines are beneficially adopted to function on Hyrdogen, and/or Hydrogen is beneficially oxidized in fuel cells for generating electrical power for transportation purposes. Yet alternatively, the system 200 includes apparatus for chemically converting Carbon Dioxide and sea water supplied to the system 200 to hydrocarbon compounds, for example to synthetic organic fuels for use in automobiles, in aircraft and in plastics materials production; the apparatus of chemically converting is provided with energy generated by the system 200.

Figure 13:
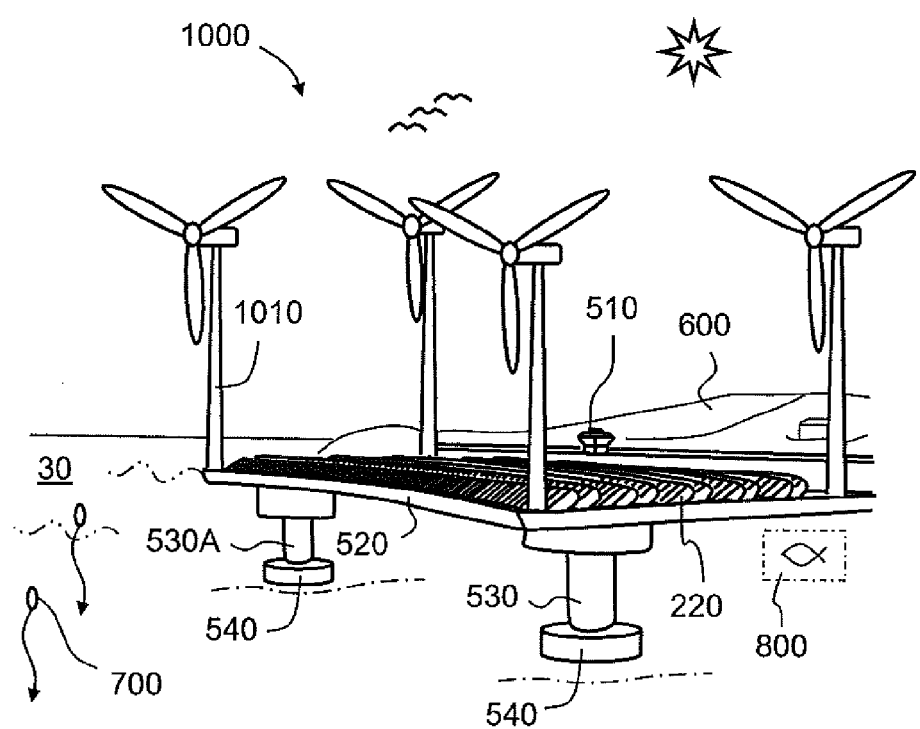
FIG. 13 is an illustration of a configuration of a coastal wave reflection ocean wave energy system including one or more wind turbines for generating additional energy from wind motion.

Referring next to FIG. 13, a modified version of the system 200 is indicated generally by 1000. The system 1000 includes one or more wind turbines 1010. Optionally, the one or more wind turbines 1010 are disposed at least at spatial extremes of the platform 520 as illustrated to achieve an optimal stability for the platform 520. Alternatively, the one or more wind turbines 1010 are concentrated near a central portion of the platform 520 and a majority of ballast (providing upward floatation force), when the platform 520 is implemented as a floating structure, is disposed at peripheral extremities of the platform 520 to provide best floating stability for the system 1000. Optionally, the platform 520 is implemented as a generally rectilinear planar component in plan view; more optionally, a leading edge of the platform 520 facing towards the ocean environment 30 is inwardly curved as illustrated for assisting to concentrate ocean wave energy. Optionally, the platform 520 is implemented to have a "T"-shaped or "Y"-shaped planar form in plan view. Optionally, as illustrated, the one or more wind turbines 1010 are implemented as conventional contemporary nacelle-type wind turbines, for example as contemporarily manufactured by companies such as GE Wind Energy Inc., Vestas AS and Gamesa SA.

Figure 14:
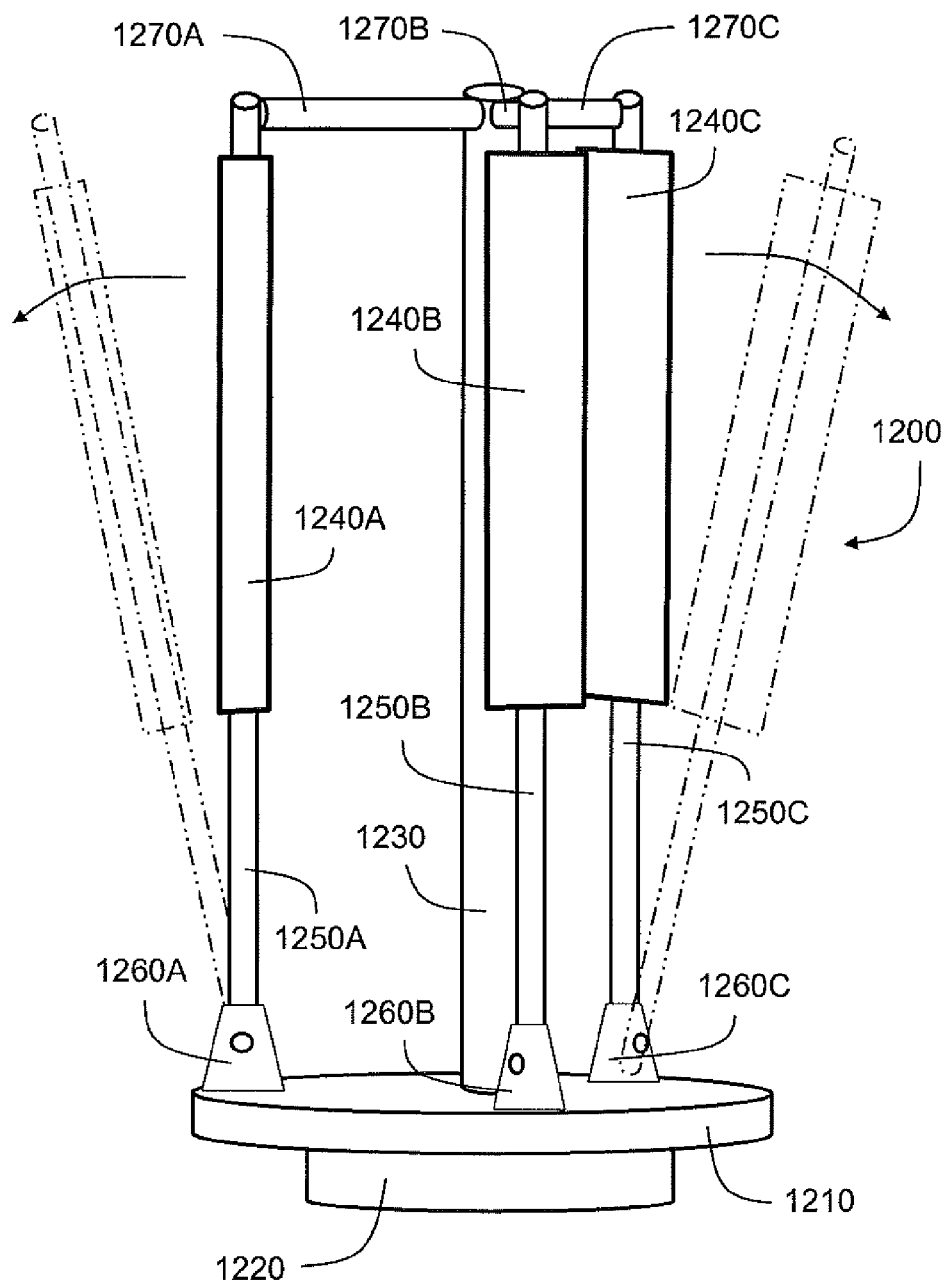
FIG. 14 is an example of a vertical-axis Darrieus wind turbine for use with energy systems pursuant to the present invention.

Optionally, one or more of the wind turbines 1010 are implemented as vertical axis wind turbines, for example Darrieus-type vertical axis wind turbines. Such Darrieus-type wind turbines beneficially include two or more substantially vertical blades, for example three blades, alternatively utilize a helical wing arrangement. Darrieus-type wind turbines are of an advantage in that they do not need to be actively steered in a direction of incoming wind, namely are essentially very simple devices, namely a factor which is susceptible to enhancing their reliability of operation. Optionally, one or more of the wind turbines 1010 are implemented as a Darrieus-type wind turbine 1200 illustrated in FIG. 14. The turbine 1200 includes a bearing mount 1220 supported by the platform 520. Moreover, the mount 1220 includes a generator for generating useable energy for output from the system 1000. The mount 1220 rotatably supports a circular base 1210 which forms a flywheel when rotating in operation; the flywheel when rotating generates Carioles forces (gyroscopic forces) which are highly beneficial to assist to stabilize the platform 520 to resists angular tilting thereof in response to the ocean waves 40 acting thereupon. When implemented as Darrieus-type wind turbines, the turbines 1010 are beneficially implemented to rotate in a mutually similar rotation direction so that their Coriolis forces are mutually additive to assist to stabilize the platform 520; optionally, braking forces are applied to the turbines 1010 implemented as Darrieus-type wind turbines in an event that they spontaneously attempt to rotate in a mutually incorrect rotation direction. The turbine 1200 includes a central axial elongate member 1230, and three turbine blades 1240A, 1240B, 1240C disposed at 120° angular intervals at a radius from the elongate member 1230 and in a substantially vertical orientation. The blades 1240A, 1240B, 1240C are supported on elongate support members 1250A, 1250B, 1250C respectively. Optionally, the elongate support members 1250A, 1250B, 1250C are pivotally mounted at their lower ends to pivot blocks 1260A, 1260B, 1260C respectively, wherein the blocks 1260A, 1260B, 1260C are supported at an upper peripheral edge of the circular base 1210. Optionally, the blocks 1260A, 1260B, 1260C are integral to the circular base 1210. The elongate support members 1250A, 1250B, 1250C are beneficially pivotally swung from a substantially vertical position to a substantially horizontal position for maintenance, or for providing the blades 1240A, 1240B, 1240C with protection in extremely severe weather conditions; optionally, the elongate support members 1250A, 1250B, 1250C are winched into position to abut and couple to radial support members 1270A, 1270B, 1270C respectively. The turbine 1210 is of benefit in that a substantial part of its mass is near a height of the platform 520, therefore enhancing operating stability of the system 1000. Moreover, the generator of the turbine 1200 is easily accessible at a height of the platform for maintenance and repair; this is in contradistinction to the nacelle-type wind turbines illustrated in FIG. 13 which include their gear boxes and generators in a relatively inaccessible manner at a top of a tower member. As an alternative to pivoting the elongate members 1250, their blades 1240 are slid down the elongate members 1250 for protection and or maintenance, and slid up the elongate members 1250 for operation.

The system 1200 is capable of providing numerous synergistic benefits in terms of power production and aquaculture in comparison to convention renewable energy systems, for example contemporary nacelle-type wind turbine parks. The system 1200 is not to be compared with other types of renewable energy systems, for example hydroelectric power systems, because the system 1200 provides synergistic benefits of coastal protection and aquaculture as well as power generation. Such synergy greatly improves the commercial viability of the system 1200 in comparison to alternative types of renewable energy systems, potentially to a level competitive in comparison to contemporary nuclear and fossil fuel power generating facilities, but devoid of waste products and pollution arising from power generation. The present invention is thus a considerable advance and improvement on known contemporary renewable energy systems.

In the forgoing, reference is made to a natural frequency of oscillation of water within an air column. From theoretical analysis, a natural period for such oscillation is given by Equation 6 (Eq. 6):

$$T_n = 2\pi \sqrt{\frac{\left(d + \frac{D}{2}\cos(\alpha)\right)}{g\sin(\alpha)}} \qquad \text{Eq. 6}$$

wherein
$T_n$=natural period of oscillation;
$\pi$=3.14159;
d=depth from mean sea level (MSL) to a middle of the hollow column;
D=inner diameter of the hollow column;
g=gravitational acceleration, 9.81 m/s$^2$; and
$\alpha$=an inclination angle of the column, wherein $\alpha$=90° denotes a vertical column, and $\alpha$=0° denotes a horizontal column From the natural period $T_n$, the natural frequency $f_n$ is readily computed from Equation 7 (Eq. 7):

$$f_n = \frac{1}{T_n} \qquad \text{Eq. 7}$$

From Equations 6 and 7 (Eq. 6 and Eq. 7), it will be appreciated, pursuant to the present invention, that tuning of the column is achievable by adjusting or setting one of more of:
(i) the depth d by way of ballasting and/or actuating the hollow column up or down relative to the mean sea level (MSL);
(ii) varying the inner diameter D of the column; and
(iii) adjusting the inclination angle $\alpha$ of the column.

Such adjustments are executed in ocean wave energy systems pursuant to the present invention.

Figure 15A:
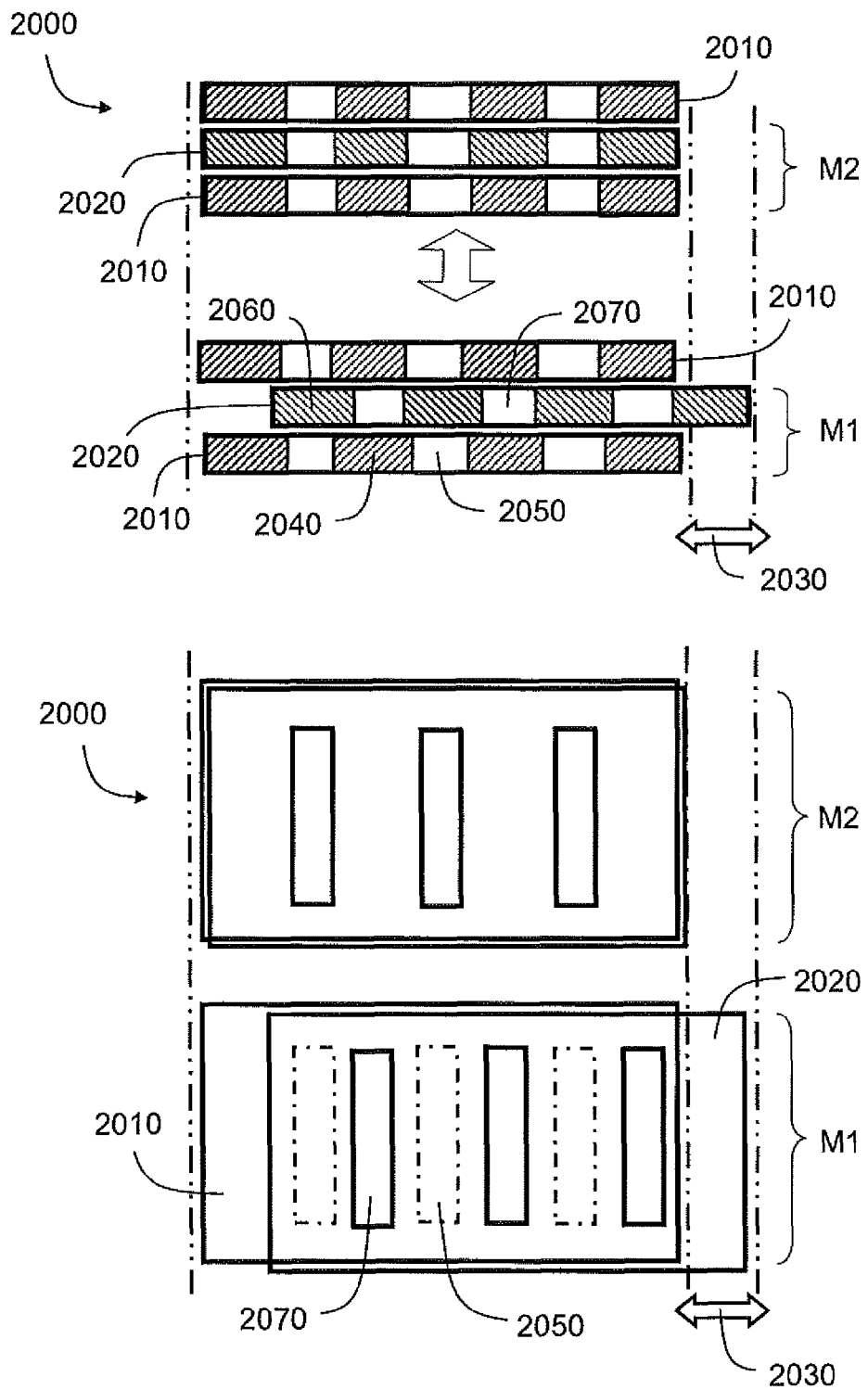
FIG. 15A and FIG. 15B are illustrations of sliding and rotating types of valves respectively for use in the systems of FIG. 11, FIG. 12 and FIG. 13.
Figure 15B:
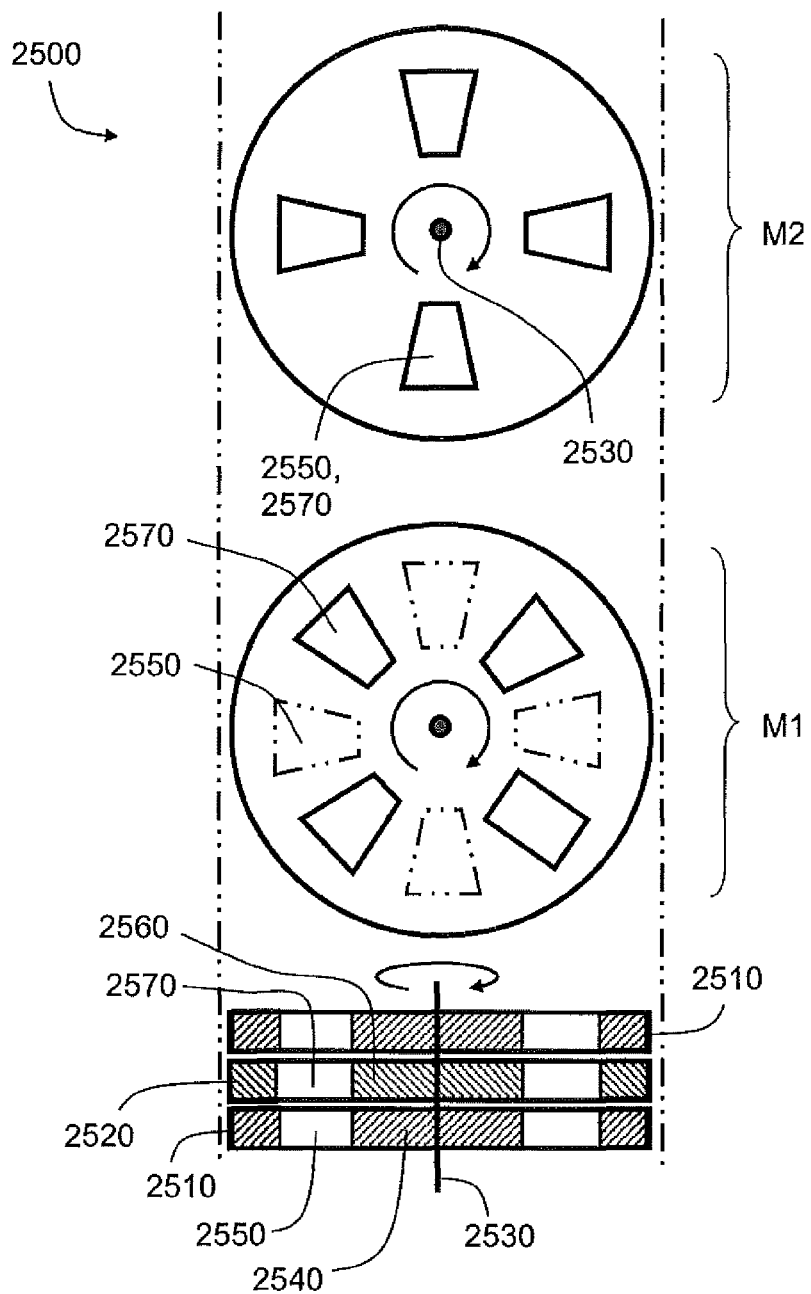
Figure 16:
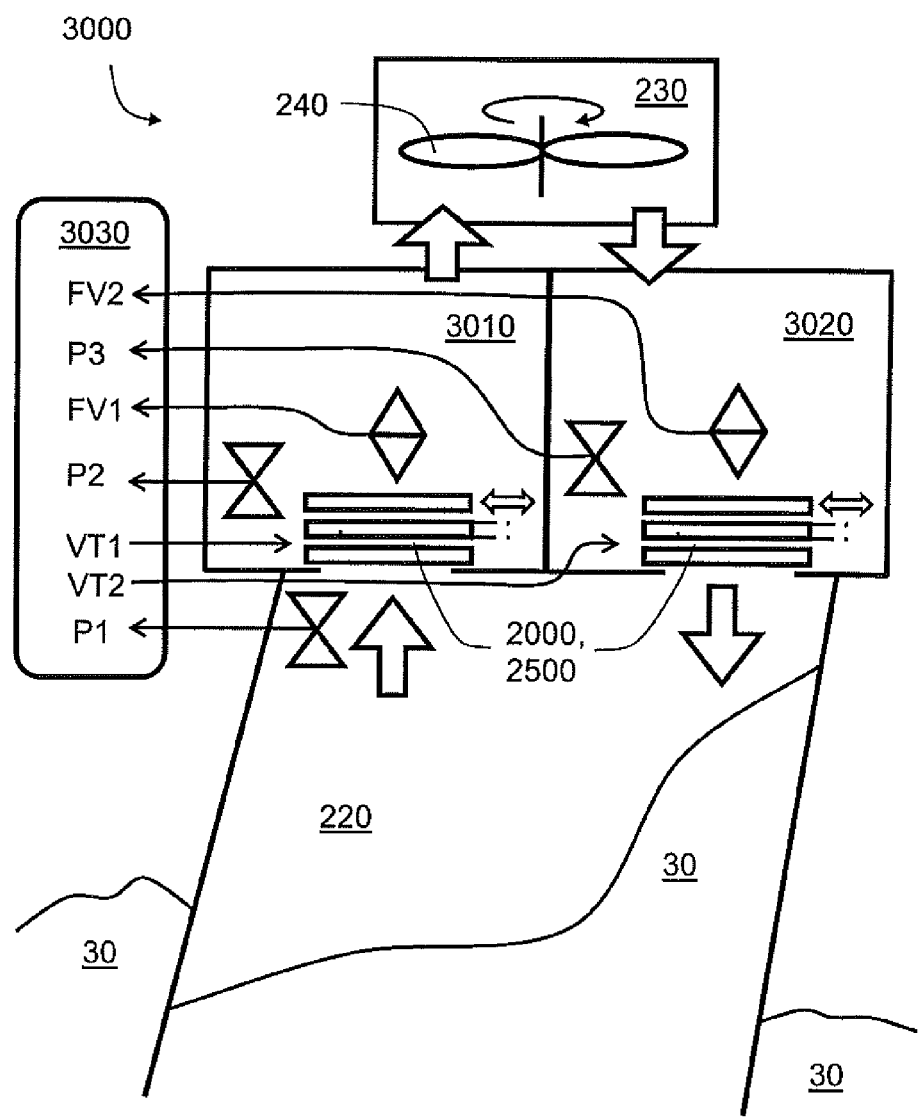
FIG. 16 is an illustration of a control arrangement for controlling actuation of the valves in FIG. 15A and FIG. 15B.

In the foregoing, it will be appreciated that air compression occurring in operation within the one or more air columns 220 is cyclical in nature in response to ocean waves 40 acting upon the one or more air columns 220 in operation. In order to generate a useful air pressure difference driving the one or more turbines 230, it is desirable that the one or more columns 220 be selectively in air communication with the one or more turbines 230 when air pressures within the one or more columns 220 are capable of most effectively driving the one or more turbines 230, namely have a greatest pressure difference therein relative to ambient air pressure. Such selective air communication is susceptible to being achieved in several different manners in respect of the present invention. However, certain implementations for selective air communication are especially useful, for example as illustrated in FIG. 15A, FIG. 15B and FIG. 16. The system 200 potentially includes a relatively large number of columns 220, for example several hundred such columns 220, for example for achieving generating performances up to ten's of MW, eventually up towards GW class when the system 200 is used as a safe environmentally-friendly alternative to nuclear facilities. In operation, phases of respective ocean waves 40 within the columns 220 will be mutually different. It is thus highly desirable that each column 220, or groups comprising spatially neighbouring columns 220 which experience in operation similar wave phases therein, be furnished with a valve arrangement that selectively couples the column 220 into air communication with the one or more turbines 230, for example via one or more air reservoirs, namely a plenum arrangement, for dampening out temporal pressure variations in compressed air supply provided to the one or more turbines 230. The valve arrangement is required to be inexpensive, be capable of performing millions of operations before needing servicing or replacement, be resistance to corrosion, be robust, and be capable of providing a tight air seal despite a risk of marine growth occurring during prolonged periods of operation. Such requirements place severe demands on a manner in which the valve arrangement is implemented. However, the present invention provides a synergistically beneficial solution to these technical constraints as will be elucidated below.

The inventor has appreciated that interfaces between certain materials, for example an interface between silica glass and polytetrafluoroethylene (PTFE) plastics material, can be lubricated by aqueous solution, for example sea water. Moreover, such materials are not susceptible to corrosion in saline environments and are resistant to marine growth occurring thereupon. Such interfaces in the presence of water form a low-friction electrostatic bearing at their mutual contact surfaces, wherein the silica glass is strongly hydrophilic, whereas the PTFE is strongly hydrophobic. Moreover, the PTFE plastics material is flexibly compliant and eventually polishes to conform with its abutting polished silica glass surface to provide a very effective air seal whilst synergistically also being a low-friction bearing surface.

Furthermore, both silica glass and PTFE are mechanically strong materials which can withstand considerable forces and wear, for example pressure shocks from waves in the columns 220. Air valves for the one or more columns 220 are beneficially implemented by employing such silica glass and PTFE plastics materials or similar, wherein opening and closing of the air valves is achieved by a sliding movement, for example implemented in a linear movement as illustrated in FIG. 15A, or by a rotating movement as illustrated in FIG. 15B. The sliding movement and rotating movements are operable to scrape away any debris collecting on the valves and also further prevent any build-up of marine growth, namely they exhibit a self-cleaning manner of operation. Although silica glass and PTFE plastics materials are described for use in the air valves, it will be appreciated that other types of glass and ceramics materials may alternatively be employed for implementing the air valves, and similarly other types of halogenated plastics materials may also be employed for implementing the air valves.

Referring to FIG. 15A, an air valve is indicated generally by 2000. The valve 2000 includes a first plate 2010 and a second plate 2020, wherein the plates 2010, 2020 are optionally fabricated from mutually different materials, for example ground silica glass and PTFE plastics materials. The plates 2010, 2020 include solid regions 2040, 2060, and one or more apertures 2050, 2070 respectively, for example an array of apertures. The plates 2010, 2020 are operable to be slid laterally, as denoted by 2030, in response to an actuation force being applied from an actuation arrangement, for example from an electromagnetic solenoid, a linear motor, a hydraulic ram, a pneumatic ram or similar. In a first state M1, namely a blocking "CLOSED" state, the one or more apertures 2050, 2070 of the plates 2010, 2020 respectively are mutually misaligned so that the valve 2000 prevents to air flow therethrough.

In a second state M2, namely an open "ON" state, the one or more apertures 2050, 2070 of the plates 2010, 2020 respectively are mutually aligned so that the valve 2000 allows rapid airflow therethrough, namely is capable of exhibiting a relatively low air flow resistance therethrough. Optionally, the second plate 2020 is included between two first plates 2010 as illustrated to form a stack of plates which are kept together by a compliant force having a direction substantially orthogonal to a plane of the plates 2010, 2020; such compliant force ensures that the valve 200 continues to be able to provide a tight seal as the plates 2010, 2020 polish and wear in operation. Optionally, there are included multiple first plates 2010 and multiple second plates 2020 in a sandwich-type arrangement; such a sandwich-type construction is especially favourable because a single actuator can be employed and the multiple plates 2010, 2020 ensure a high reliability of blocking characteristic and an enhanced robustness to pressure shocks.

When the plates 2010, 2020 are to be fabricated from glass, for example from melted-down recycles glass bottles, a block of glass is cast with its apertures formed also by casting, followed by a grinding operation to form polished interfacing surfaces thereon. When the plates 2010 are fabricated from PTFE plastics materials or similar, a sheet of PTFE plastics material is cut to size and then one or more apertures formed therein, for example by laser cutting or by mechanical punching operations. Beneficially, the plates 2010 are fabricated from silica glass, and the plate 2020 is fabricated from PTFE plastics material or similar halogenated plastics material; such an implementation is beneficial in that the plate 2020 fabricated from PTFE plastics material is relatively lightweight, is capable of surviving repeated mechanical shocks when being shuttled back and forth between "OPEN" and "CLOSED" positions, and is flexibly compliant to provide a soft support of the plates 2010 fabricated from silica glass to prevent them from shattering when subject to shock forces. As aforementioned, a further advantage of such an implementation is that the silica glass can be manufactured from recycled glass materials, for example from melted-down recycled glass bottles; glass is well known to be extremely strong and capable of containing high pressure differences, for example a vacuum as in cathode ray tubes (CRTs) and thermionic electron tubes.

Beneficially, the plates 2010, 2020 each include an array of apertures 2050, 2070 respectively, so that the plates 2010, 2020 only need to be moved a relatively small proportion of their spatial extent to switch the valve 2000 between its "OPEN" and "CLOSED" states. This potentially enables the valve 2000 to be switched very quickly, namely actuated between the states M1 and M2, for example within fractions of a second. Moreover, the array of apertures 2050, 2070 also ensures that the valve 2000 exhibits a low flow resistance to air passing therethrough when in its "OPEN" state allowing, effectively, a rapid transfer of energy from the columns 220 via the plenum arrangement to the one or more turbines 230.

Referring to FIG. 15B, an alternative implementation of a valve is indicated generally by 2500, for selectively coupling one or more columns 220, optionally via an air reservoir, namely the aforesaid plenum arrangement, to the one or more turbines 230. The valve 2500 is operable between its first state M1, namely "CLOSED" state for blocking air flow therethrough, and its second state M2, namely "OPEN" open state for passing air flow therethrough, by way of a rotational motion as illustrated. Electric motors, hydraulic rotational motors, pneumatics rotational motors, linear actuators and similar can be used to cause the rotational motion as illustrated about a rotational axis 2530. The valve 2500 comprises a first plate 2510 including solid regions 2540 and one or more apertures 2550, and a second plate 2520 also including solid regions 2560 and one or more apertures 2570.

In the first state M1, at least one of the plates 2510, 2520 is mutually rotated so that their apertures 2550, 2570 respectively are mutually non-overlapping, so that the valve 2500 is operable to prevent airflow therethrough. In the second state M2, at least one of the plates 2510, 2520 are mutually rotated so that their apertures 2550, 2570 respectively are mutually aligned, so that the valve 2500 is operable to permit airflow therethrough. Optionally, an additional plate 2510 is provided so that the plate 2520 is sandwiched between two plates 2510 for mechanical support. Optionally, several plates 2510 and several plates 2520 are included spatially alternately in a sandwich-type arrangement and operated by a single actuator to provide an especially effective blocking to air flow therethrough in the "CLOSED" state and a high degree of reliability of blocking air flow. The plates 2510, 2520 are beneficially fabricated from silica glass and PTFE plastic materials or similar as elucidated in the foregoing, which are susceptible to being lubricated by aqueous solution, for example, by spray or dampness from the ocean environment 30; for example, the plate 2520 is beneficially fabricated from PTFE plastics material, and the plates 2510 are fabricated from silica glass. In a similar manner to the aforesaid valve 2000, rotational motion in the valve 2500 results in polished air-sealing surfaces being formed at interfaces between the plates 2510, 2510 and prevents build-up of any marine growth by way of self-cleaning action during actuation.

Operation of the valves 2000, 2500 when implementing the system 200 will now be described with reference to FIG. 16 and FIG. 17 to provide a system indicated generally by 3000. When waves 40 are oscillating within the columns 220, for example in a resonant manner as elucidated in the foregoing, both rarefactions and compressions of air occur at an upper spatial region of the columns 220. When there are many columns 220 in the system 3000, and the system 3000 has considerable spatial extent, for example 500 meters to several kilometers wide orthogonal to a predominant direction of wave 40 propagation in the ocean environment 30, wave 40 motions in the columns 220 are not necessarily temporally synchronized. In consequence, each column 220, or groups of spatially adjacent columns 220 enjoying substantially mutually synchronous wave motions therein, are provided with an arrangement as illustrated in FIG. 16. The system 3000 includes the aforementioned one or more turbines 230 provided with compressed air from a high-pressure reservoir 3010, namely high-pressure plenum arrangement, and provided with an air output sink via a low-pressure reservoir 3020, namely low-pressure plenum arrangement. In operation, it is desirable that the columns 220 only selectively contribute compressed air to the high-pressure reservoir 3010 when pressures at upper regions of the columns 220 momentarily exceed a pressure within the high-pressure reservoir 3010. Similarly, in operation, it is desirable that the columns 220 only selectively receive output sink air when pressure at upper regions of the columns 220 momentarily is lower than a pressure within the low-pressure reservoir 3020. Such a manner of operation provides a greatest pressure difference between the reservoirs 3010, 3020 and hence a greatest differential operating pressure across the one or more turbines 230, thereby improving their operating efficiency for electrical power generation.

The aforesaid reservoirs 3010, 3020 are beneficially coupled to each column 220, or group of such spatially adjacent columns 220, via valves, for example implemented as one or more of the valves 2000, 2500. Each column 220, or group of such spatially adjacent columns 220, is provided with a pressure sensor for measuring an instantaneous pressure P1 within the column 220. The high-pressure reservoir 3010 includes a pressure sensor for measuring an instantaneous pressure P2 within the high-pressure reservoir 3010. Moreover, the low-pressure reservoir 3020 includes a pressure sensor for measuring an instantaneous pressure P3 within the low-pressure reservoir 3020. The valve 2000, 2500 employed for coupling the column 220 to the high-pressure reservoir 3010, namely "inlet valve", is provided spatially locally thereto with an air flow sensor for measuring an instantaneous air flow FV1 and air-flow direction through the valve 2000, 2500 from the column 220 into the high-pressure reservoir 3010. Similarly, the valve 2000, 2500 coupling the column 220 to the low-pressure reservoir 3020, namely the "outlet valve", is provided spatially locally thereto with an air flow sensor for measuring an instantaneous air flow FV2 and air-flow direction through the valve 2000, 2500 from the low-pressure reservoir 2010 into the column 220. The system 3000 includes a control unit 3030 for receiving signals corresponding to the pressures P1, P2, P2, and the flow rates FV1, FV2 and their respective flow directions. Moreover, the control unit 3030 includes outputs VT1, VT2 for controlling actuators of the valves 2000, 2500 coupling to reservoirs 3010, 3020 as illustrated for switching them between their aforesaid "CLOSED" and "OPEN" states. The control unit 3030 beneficially includes computing hardware which is operable to execute one or more software products recorded on machine-readable data storage media for performing its valve-controlling operations.

Operation of the system 3000 will now be described with reference to FIG. 15A, FIG. 15B, FIG. 16 and FIG. 17. The waves 40 cause cyclical pressurizations and rarefactions to occur within the upper region of the column 220. Beneficially, the dimensions of the column 220 and its height relative to the ocean environment 30 are tuned to a wavelength and thus periodicity of the waves 40, namely is capable of performing as a tuned air column. For convenience, as aforementioned, the valve 2000, 2500 coupling from the column 220 to the high-pressure reservoir 3010 will be referred to as being an "inlet valve", and the valve 2000, 2500 coupling from the column 220 to the low-pressure reservoir 3020 will be referred to as being an "outlet valve". The inlet and outlet valves are normally in a "CLOSED" state, namely a state M1 as illustrated in FIG. 15A and FIG. 15B to block air-flow occurring therethrough. The inlet valve is opened, namely switched into an "OPEN" state, when the pressure P1 exceeds the pressure P2. Moreover, the outlet valve is opened, namely switched into an "OPEN" state, when the pressure P1 is lower than the pressure P3. The control unit 3030 is operable to monitor airflow rates FV1, FV2 and associated air-flow directions through the inlet and outlet valves respectively immediately after these valves are switched from their "CLOSED" state to their "OPEN" state; the air flow rates are initially higher and then diminish to approximately zero flow rate and eventually will flow in a reverse direction unless flow is hindered by the valves 2000, 2500. When one or more of the flow rates FV1, FV2 diminish to within a threshold of zero flow rate or begin to flow in a reverse direction, the inlet and outlet valves as appropriate are closed to avoid unnecessarily draining the reservoirs 3010, 3020 of air pressure difference therein. In an event that one or more of the flow rates FV1, FV2 are greater than the threshold when the inlet and outlet valves are in their "CLOSED" state, or it is clear from the air-flow rate direction that any of the valves are draining the reservoirs 3010, 3020 unnecessarily, this is indicative of potential failure of at least one of the inlet valve and outlet valve and is detected by the control unit 3030 as a fault situation needing attention, for example at least one of the inlet and outlet valves has become worn or damaged. Optionally, the system 3000 is arranged such that the reservoirs 3010, 3020 each include a hierarchy of small sub-reservoirs each provided with isolation valves 2000, 2500, so that failure of one valve 2000, 2500 of one column 220 of the system 3000 does not cause cessation of operation of the system 3000 as a whole, but can be accommodated by isolating faulty columns 220 and associated inlet and outlet valves. Such isolation in fault conditions is beneficially executed by the control unit 3030, although it is anticipated that such failure would occur rarely on account of the robust and durable nature of the valves 2000, 2500 as described in the foregoing.

On account of the valves 2000, 2500 being actuated in operation in a plane which is orthogonal to a direction of forces applied to the valves 2000, 2500 by way of rarefaction and compression of air occurring within upper regions of the columns 220, and on account of the valves 2000, 2500 employing interfacing surfaces forming effectively a polished electrostatic bearing thereat, relatively little actuating power and thus actuating force is required for operating the valves 2000, 2500 of the system 200, 3000 between their "CLOSED" and "OPEN" states.

Figure 17:
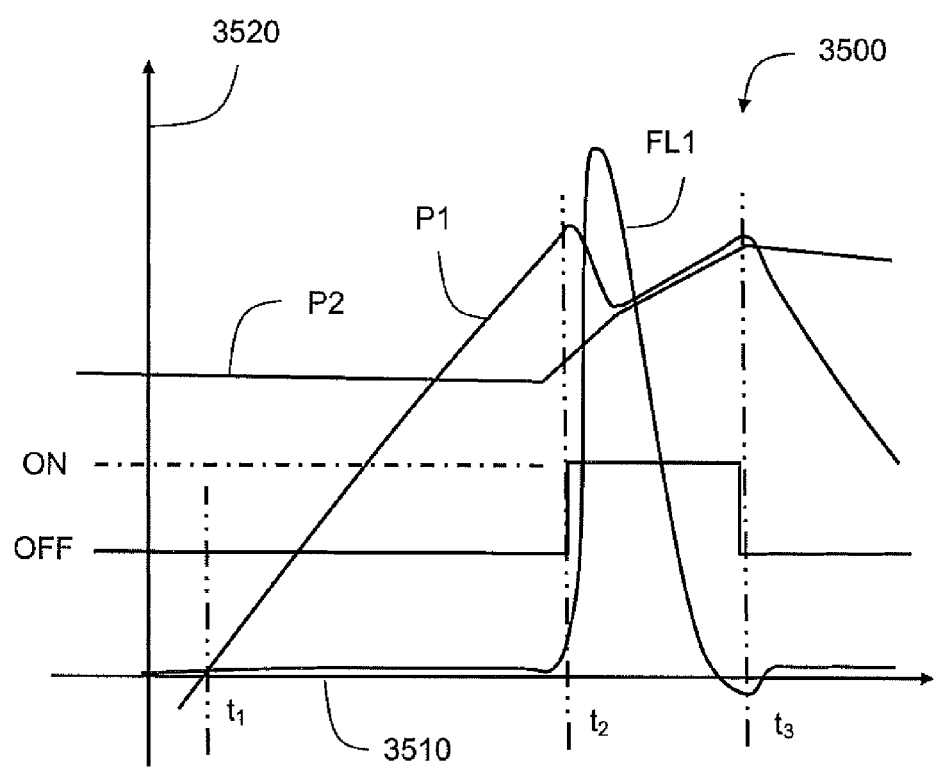
FIG. 17 is an illustration of operation of valves of the system in FIG. 16.

Referring to FIG. 17, a graph illustrating operation of the valve 2000 feeding into the high-pressure reservoir 3010 is indicated generally by 3500. An abscissa axis 3510 denotes passing of time from left to right, and an ordinate axis 3520 denotes various parameters including increasing pressure from bottom to top, increasing flow rate from bottom to top and valve switching state from "CLOSED" to "OPEN".

STEP 1: Initially, at a time $t_0$, at a left-hand side of the graph 3500, a wave 40 enters a given column 220 and causes the pressure P1 gradually to rise at a top region of the column 220. Already, a high initial pressure P2 has been established in the high-pressure reservoir 3010. The inlet valve 2000, 2500 is in an "CLOSED" state to prevent air-flow therethrough.

STEP 2: When the pressure P1 exceeds the pressure P2 by a threshold amount at a time $t_1$, the inlet valve 2000, 2500 is switched by actuation from its "CLOSED" state to its "OPEN" state to allow air-flow therethrough. Opening of the inlet valve 2000, 2500 causes the flow rate FL1 to rise dramatically and then diminish as the pressure P1, P2 mutually equalize.

STEP 3: when the flow rate FL1 is within a threshold of zero or has just begun to be reversed, namely flow occurring back into the column 220, the inlet valve 2000, 2500 is actuated to its "CLOSED" blocking state to prevent loss of air pressure from the high-pressure reservoir 3010 and to force the flow-rate FL1 to zero.

By resonance, the wave 40 in the column 220 causes rarefaction at the upper region of the column 220 and a corresponding cycle to aforesaid STEPS 1 to STEP 3 is executed in respect of the outlet valve 2000, 2500 coupling between the low-pressure reservoir 3020 and the column 220, except that pressures are negative and flow-rate from the low-pressure reservoir 3020 into the column 220 occurs. Control of actuators of the inlet and outlet valves 2000, 2500 is performed from the aforesaid control unit 3030.

Beneficially, the valves 2000, 2500 with their associated pressure sensors and directional air-flow sensor are manufactured as a mass-produced standard valve unit. Optionally, larger diameter columns 220 of the system 200, 3000 are beneficially provided with several such standard valve units, whereas smaller-diameter columns 220 of the system 200, 3000 are provided with merely a single such standard unit. On account of the columns 220 being passive components, the active one or more turbines 230 are well protected from the ocean environment 30. The valves 2000, 2500 perform a useful function of protecting the one or more turbines 230 and are therefore an important part of the system 200, 3000. It is therefore highly desirable that the valves 2000, 2500, namely employed in large numbers in the system 200, 3000, exhibit high reliability when in operation, are easy to service and replace, and are of relatively low cost, for example made possible by mass-production methods, and potentially using recycled materials in their production in an environmental friendly manner.

Figure 18A:
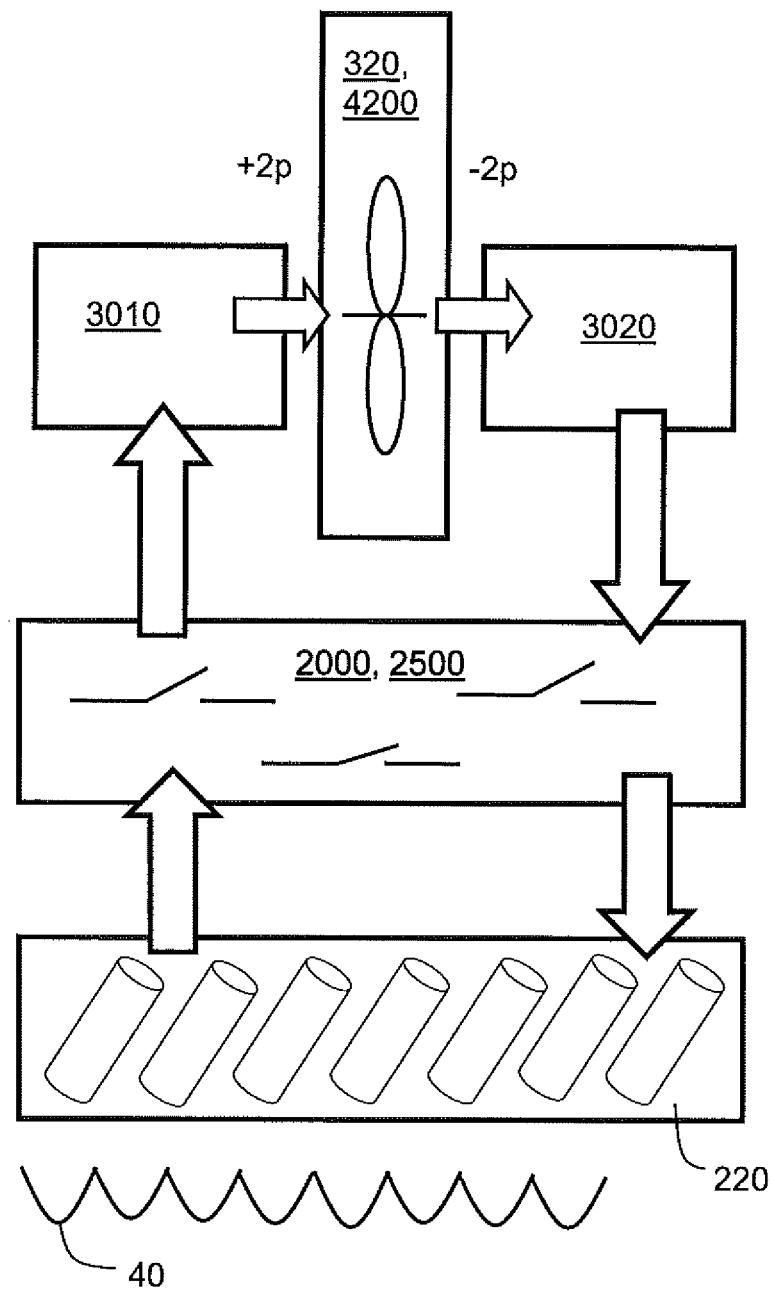
FIG. 18A and FIG. 18B are illustrations of air reservoir and air turbine arrangements for use with systems pursuant to the present invention.
Figure 18B:
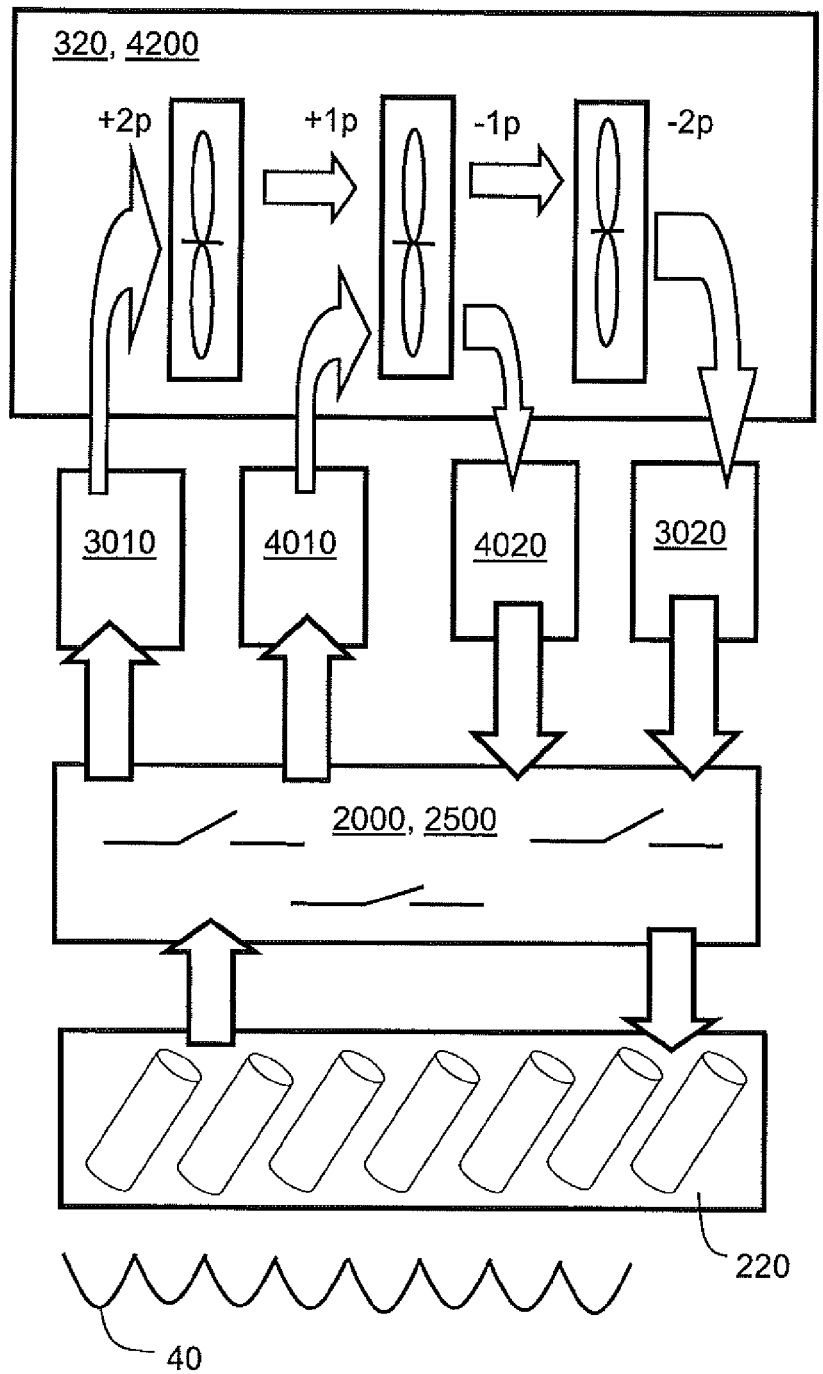

In the foregoing, the two reservoirs 3010, 3020, as illustrated in FIG. 18A, are operable to receive compressed or rarefied air supplies from the one or more columns 220 via their valves 2000, 2500 for supplying the one or more turbines 320 with an air flow 4000 therethrough for generating electrical power. Optionally, as illustrated in FIG. 18B, the one or more turbines 320 include multiple stages for enabling them to receive compressed and rarefied air from multiple reservoirs 3010, 3020, 4010, 4020 operating at mutually different pressures, for example +2p, +1p, −1p, −2p for the reservoirs 3010, 3020, 4010, 4020 respectively, wherein the turbine 320 includes at least three stages 4050A, 4050B, 4050C. Optionally, in the system 200, 3000, when a given column 220 is unable to develop sufficient pressure to supply the reservoirs 3010, 3020, the given column is selectively coupled via air valve switching networks to the other reservoirs 4010, 4020 operating at lower excess pressure or excess under pressure relative to ambient pressure in comparison to the reservoirs 3010, 3020. Such an arrangement is capable of improving total energy production from the system 200, 3000 even if some of its columns 220 are unable to generate sufficient pressure in operation for feeding air to and/or from the reservoirs 3010, 3020, but can nevertheless contribute to energy production by feeding air supply via the additional reservoirs 4010, 4020 to the one or more turbines 320. Although two additional reservoirs 4010, 4020 are described, it will be appreciated that there are optionally employed many more such additional reservoirs if necessary, for example operating at various pressure differences relative to ambient pressure.

Figure 1:
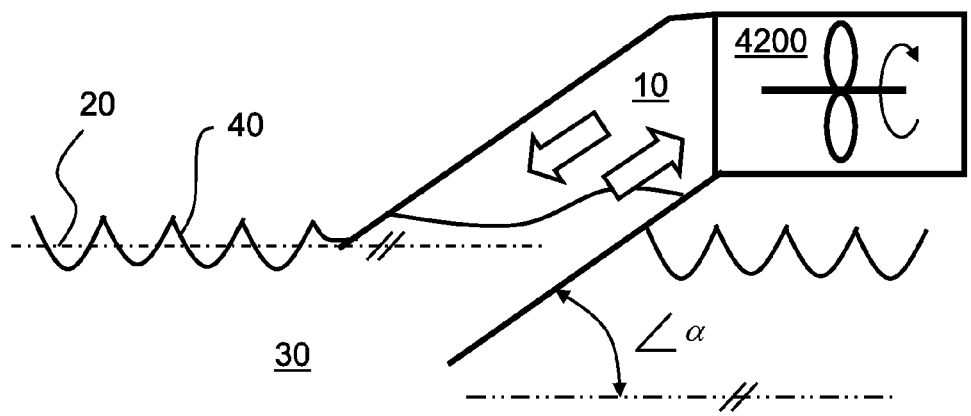
FIG. 1 is an illustration of an arrangement for generating electrical power from ocean waves as described in Norwegian patent no. NO 327593 (inventor: Geir Arne Solheim)

Use of compressed air reservoirs 3010, 3020, 4010, 4020 in the system 200, 3000 provides an advantage that a central turbine facility, including the one or more turbines 320, can be employed, wherein the one or more turbines 320 are optionally operated synchronously in respect of an alternating frequency of an electrical supply network to which the system 200, 3000 is connected. Alternatively, as illustrated in FIG. 1, each column 220 is provided with its own associated turbine 4200. Such an approach results in the columns 220 being capable of operating in a mutually entirely autonomous manner, such that other columns 220 and their associated turbines 4200 are able to continue functioning in an event of the columns 220 developing a fault in operation.

Figure 19A:
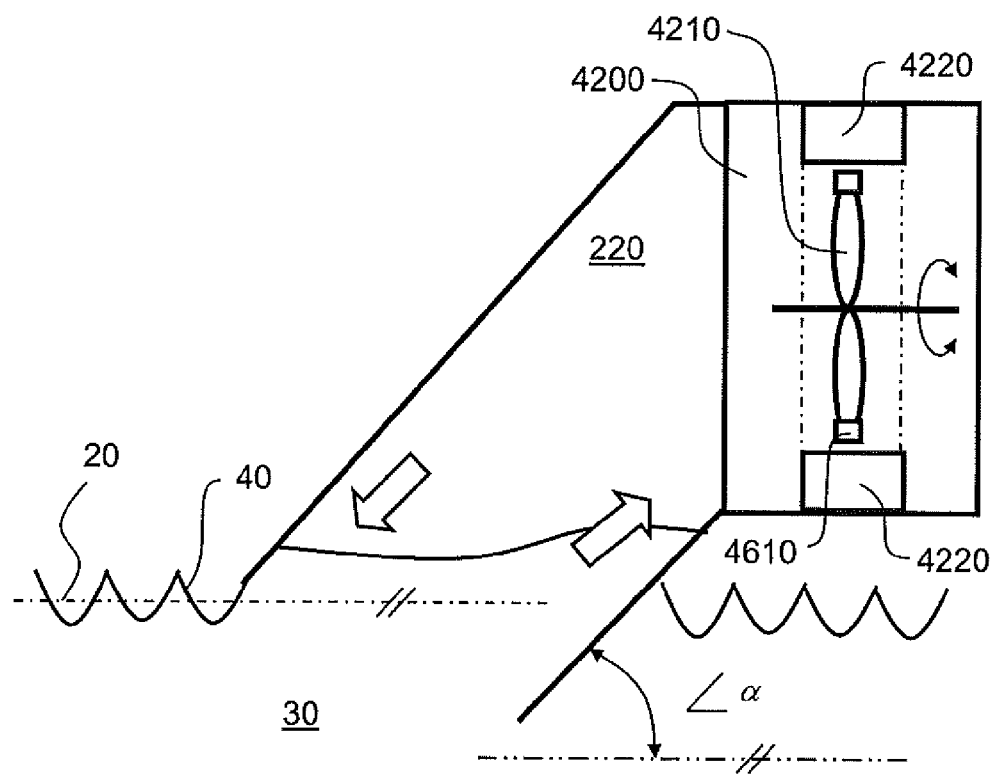
FIG. 19A, FIG. 19B and FIG. 19C are illustrations of various turbine implementations for use with a system pursuant to the present invention.

In FIG. 19A, the column 220 is provided at its upper region with an associated turbine 4210 which is provided with a local energy pickoff 4220, for example implemented using direct electromagnetic induction at a peripheral edge of the turbine 4210 whereat movement velocity is greatest in operation, and wherein the turbine 4210 is capable of continuing to rotate irrespective of flow direction therethrough; for example, a turbine as described in United States patent application no. US 2010/0209236A1 ("Impulse Turbine for Use in Bi-Directional Flows"; inventors—Christopher Freeman, Stephen Herring, Kevin Banks) is optionally employed for implementing the turbine 4210; United States patent application no. US 2010/0209236A1 is hereby incorporated by reference. Alternatively a form of turbine as described in a U.S. Pat. No. 5,642,984 ("Helical Turbine Assembly operable under Multidirectional Fluid Flow for Power and Propulsion Systems"; inventor Alexander M. Gorlov), for example in a compact form as described in a granted U.S. Pat. No. 5,577,882 ("Unidirectional Reaction Turbine operable under Reversible Fluid Flow"; inventors Boris Istorik, Iouli Chpolianski, Alexander Gorlov) is employed for implementing the turbine 4200; U.S. Pat. No. 5,642,984 and U.S. Pat. No. 5,577,882 are hereby incorporated by reference. Equivalent types of flat radial turbines operable to turn in a single direction in response to bi-directional air flow therethrough are optionally employed for implementing the turbine 4210.

Figure 19B:
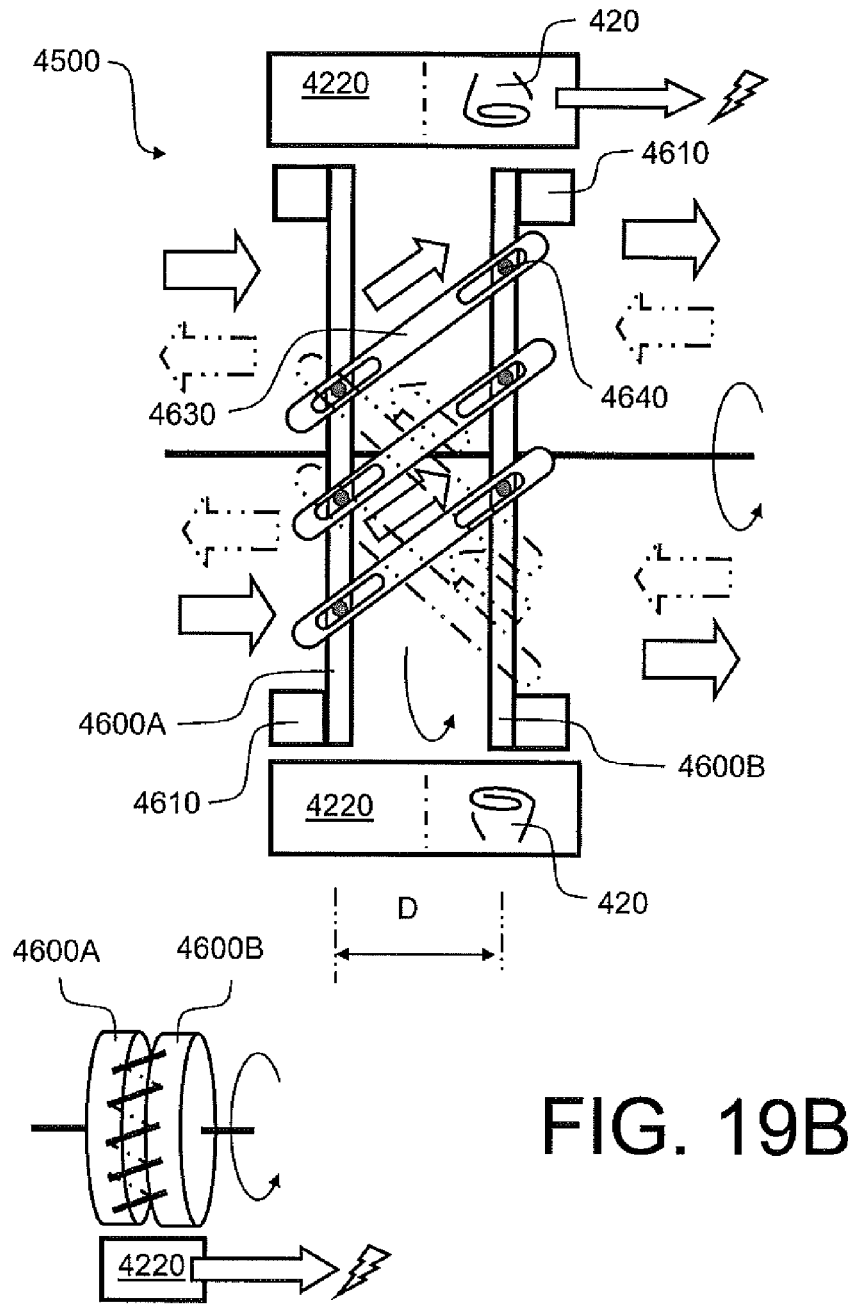
Figure 19C:
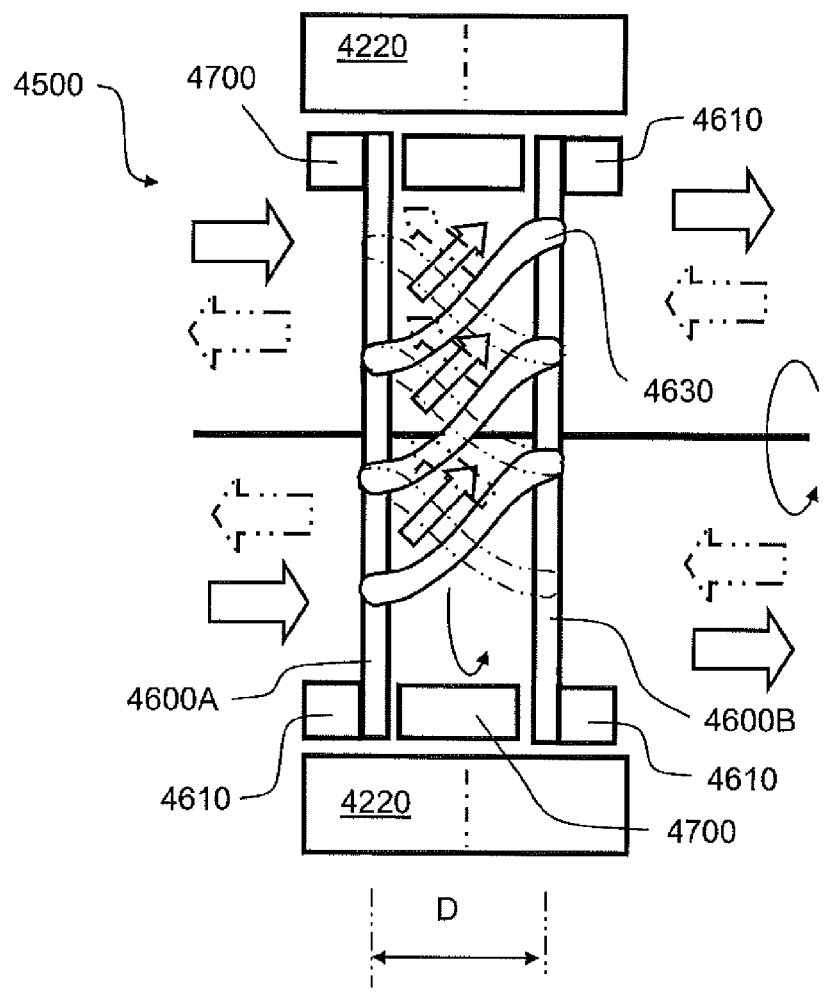

Alternatively, where exceptionally high energy conversion efficiency is required at the turbine 4210 and the turbine 4200 is required to be as compact as possible, the turbine 4210 is beneficially implemented using a radial rotor 4500 as illustrated in FIG. 19B whose blades 4510 are actuated, or otherwise moveable, in response to a direction of air flow through the turbine 4210 to maintain the turbine 4210 rotating in a constant direction and thereby maintaining its rotational inertial when in operation. Optionally, the turbine 4200 is implemented as illustrated in FIG. 19C wherein the turbine 4200 includes first and second radial rotatable planar components 4600A, 4600B with permanent magnets 4610 at their peripheral edge for providing direct electromagnetic energy pickoff via peripheral pickup coils 4620A, 4620B. The planar components 4600A, 4600B are disposed axially at a distance D apart and are coupled together via, for example, radial vane elements 4630 having linearly-slidable and rotatable coupling joints 4640 as illustrated. By preferentially creating excess drag on one of the components 4600A, 4600B relative to the other thereof, or alternatively by applying an electromagnetic torque preferentially to one of the components 4600A, 4600B relative to the other during power extraction from the 4200, the vane elements 4630 are dynamically flipped in pitch angle so that pulsating bi-direction flows of air through the turbine 4200 is FIG. 19C are efficiently converted to electrical energy irrespective of air flow direction past the vane elements 4630. When starting up the turbine 4200 into rotation, the pickup coils 4620A, 4620B are beneficially energized so that the turbine 4200 is operated briefly as an electric stepper motor; once rotating, operation by alternating drag and/or alternating drive torque on the planar components 4600A, 4600B keeps the turbine 4200 rotating in response to pulsating air flow therethrough.

Optionally, the vane elements 4630 are fabricated from a robust flexible material, for example from reinforced polyurethane which is capable of withstanding millions of flexural cycles and also being inert to corrosion in respect of saline water in the ocean environment 30. Optionally, the vane elements 4630 are greater in lateral extent to the axial distance between the planar components 4600A, 4600B so that the vane elements 4630 are bent into slight curvature and excite an abrupt flip motion when adapting to different directions of air flow through the turbine 4200. The turbine 4200 as illustrated in FIG. 19C is beneficial in that it can be made with few moving parts and its control is implemented largely electronically. Determination of air flow directions within the columns 220 for purposes of controlling the pitch angles of the vane elements 4630 of their turbines 4200 is beneficially implemented using flow sensors, for example above the turbines 4200 and thereby remote from the ocean environment 30; such a flow direction sensor is, for example, implemented using a pressure-dropping orifice with two pressure sensor sensors to determine instantaneous pressures at upstream and downstream sides of the orifice; optionally, the orifice is a part of the structure of the column 220.

Optionally, the planar components 4600A, 4600B are temporarily locked together in operation, for example by applying a magnetic force thereto via a magnetic clutch and/or hydraulic clutch disposed between the planar components 4600A, 4600B, once their vane elements 4630 have assumed a correct instantaneous pitch angle for coping with a given instantaneous flow of air through the turbine 4200; such locking can be achieved, for example, using electromagnets 4700 included on the planar components 4600A, 4600B which are energized via electromagnetic power transfer to the components 4600A, 4600B to attract the components 4600A, 4600B together so that they rotate as a single unitary entity in response to a given direction of pulsed air flow through the turbine 4200 and for a corresponding given pitch angle of the vane elements 4630. Optionally, the turbine 4200 can be deployed to include multiple rotors, namely to be multi-staged when large amounts of power are to extracted, for example from relatively larger columns 220 included in the system 200, 3000.

Although extraction of power from the columns 220 is described in the foregoing based on air being cyclically pressurized and rarefied in response to wave motion in the columns 220, for example resonant wave motion therein, it is optionally feasible pursuant to the present invention, to deploy at least a portion of the turbine 4200 at a bottom region of the columns 220 to be directly acted upon by waves oscillating within the columns 220. Optionally, it is desirable that at least a portion of the turbine 4200 is then beneficially retractable from the columns 220 in adverse weather conditions to avoid damage being sustained by the at least one portion of the turbine 4200 deployed in the bottom region.

When the system 200, 1000, 3000 is implemented as a floating structure, it is important that it is firmly anchored in view of the forces acting upon it, especially when it includes wind turbines producing many 10's to 100 MW's of power, possibly even GW for large installations. Thus, the system 200, 1000, 3000 beneficially is anchored by at least one anchor when employed in a floating configuration. More optionally, the system 200, 1000, 3000 is anchored at least at each of its four extreme corners. Suitable anchoring arrangements for the system 200, 1000, 3000 are known from offshore oil platform structures, for example as described in U.S. Pat. No. 7,752,989 B2 ("Deep Water High Capacity Anchoring and Method of Operation thereof"; inventors—Vladimir Paz, Elisabeth Porto, Cipriano Mediros Jnr.; assignee—Petrobras) hereby incorporated by reference, and also described in U.S. Pat. No. 3,934,528 B ("Means and Methods for Anchoring of Offshore Tension Leg Platform"; inventors—Edward Horton, John Brewer, William Silcox, T. A. Hudson; assignee—Deep Oil Technology Inc.) hereby incorporated by reference.

In overview, the following anchoring arrangements are susceptible to being optionally employed for anchoring the system 200, 1000, 3000:

(i) via anchors secured into boreholes drilled into the seabed;
(ii) via buoyant steel-walled and/or concrete-walled hollow tanks towed into position on the ocean surface, then filled with water to sink then to the seabed, and then filled with a sand/adhesive binding agent fluid which then sets within the tanks so that they form anchors resting on the seabed, and wherein the tanks are coupled via chains and/or cables to floating portions of the system 200, 1000, 3000; optionally, the adhesive binding agent is an epoxy or a marine-grade concrete; optionally, the tanks have a generally flat planar form so that at least one of their major surfaces are adapted to contact onto the seabed, and are further retained on the seabed by depositing ballast stone thereupon; and
(iii) via use of one or more impact anchors which each comprise a massive member with a rounded or pointed front end and with vanes at its rear end, for example in a form akin to a torpedo, to which a mooring chain is also connected; during installation, each impact anchor is brought by ship to a location at which the anchor is to be deployed, the anchor is then released substantially vertically downwards so that its rounded or pointed front end impacts onto the seabed and penetrates into the seabed, and the chain is then subjected to a non-vertical, namely lateral force, to draw the anchor a small distance backwards for embedding the vanes of the anchor into the seabed; such an approach is highly cost effective and rapid in deployment, but requires that the seabed is of such a geological composition that the anchor is capable through impact of embedding itself into the seabed; such an anchor is beneficial when the seabed is geologically gravel, moraine, clay or similar material which can be displaced through impact; approaches (i) and (ii) above are beneficially employed when the seabed is of harder composition, for example granite.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

I claim:

1. An ocean wave energy system for generating power from ocean waves, wherein said system includes a platform supporting an array of hollow columns whose respective lower ends are in fluidic communication with ocean waves and whose respective upper ends are in air communication with a turbine arrangement such that wave motion occurring at the lower ends is operable to cause air movement within said columns for propelling said turbine arrangement to generate power output,
wherein said hollow columns are deployed in a non-vertical orientation, and at least a portion of said hollow columns are arranged in operation to exhibit a natural frequency of wave motion therein which is substantially matched to a frequency of ocean waves received at the portion of said hollow columns,
wherein the system further comprises at least one fluid valve having a plurality of mutually abutting components each including one or more apertures, and wherein the components are moveable between a first state wherein the one or more apertures are mutually non-aligned for preventing fluid flow through the valve, and a second state wherein the one or more apertures are mutually aligned for enabling fluid flow through the valve.

2. The ocean wave energy system as claimed in claim 1, wherein said hollow columns are implemented so that their natural frequency of wave motion therein is actively tuneable.

3. The ocean wave energy system as claimed in claim 1, wherein said array of hollow columns are disposed with their elongate axes at an oblique angle in a range of 25.degree. to 75.degree. relative to an average level of an upper surface of an ocean environment in which the system is located in operation.

4. The ocean wave energy system as claimed in claim 1, wherein said array of hollow columns includes hollow columns having mutually different natural resonant frequencies in respect of wave motion therein for selectively matching to different frequencies of waves received from an ocean environment.

5. The ocean wave energy system as claimed in claim 1, wherein said turbine arrangement includes at least one turbine operable to rotate about a substantially vertical axis in operation for gyroscopically stabilizing said platform when operating in an ocean environment.

6. The ocean wave energy system as claimed in claim 1, wherein said system includes one or more wind turbines mounted upon said platform for generating power from wind received at said system.

7. The ocean wave energy system as claimed in claim 6, wherein said one or more wind turbines are mounted at least at spatial extremes of said platform.

8. The ocean wave energy system as claimed in claim 6, wherein said one or more wind turbines are mounted at a central region of said platform, and a ballast arrangement providing upward floatation forces is implemented at spatial extremes of said platform.

9. The ocean wave energy system as claimed in claim 6, wherein said one or more wind turbines include one or more Darrieus-type vertical-axis wind turbines.

10. The ocean wave energy system as claimed in claim 1, wherein said system further includes one or more aquaculture facilities.

11. The ocean wave energy system as claimed in claim 10, wherein said one or more aquaculture facilities are adapted to be submergible in an ocean environment is response to changes in weather conditions experienced by said system when in operation.

12. The ocean wave energy system for generating power from ocean waves as claimed in claim 1, wherein
(i) movement of the components is operable to provide the fluid valve with a self-cleaning function for preventing marine growth upon the components; and
(ii) interfacing surfaces between the components are arranged to be a water-lubricated electrostatic bearing by way of one of the interfacing surfaces being hydrophobic in nature abutting onto a corresponding interfacing surface being hydrophilic in nature.

13. The ocean wave energy system for generating power from ocean waves as claimed in claim 1 further comprising a turbine arrangement, wherein the turbine arrangement is operable to perform unidirectional rotation in response to bidirectional fluid flow therethrough, wherein the turbine arrangement includes a plurality of radial turbine components which are each provided with a corresponding energy pickoff arrangement, and a plurality of vane elements coupling between said plurality of radial turbine components and/or mounted on an arrangement coupling between said plurality of radial turbine components, wherein a relative rotation angle between the plurality of radial turbine components is operable to control pitch angles of the plurality of vane elements for adapting said turbine arrangement to maintain a unidirectional rotation direction in response to bidirectional fluid flow therethrough.

14. The ocean wave energy system for generating power from ocean waves as claimed in claim 13, wherein the turbine arrangement includes an electronic control arrangement for selectively applying drag or torque to said plurality of radial turbine components for adjusting the pitch angles of the plurality of vane elements.

15. An ocean wave energy system for generating power from ocean waves, wherein said system includes a platform supporting an array of hollow columns whose respective lower ends are in fluidic communication with ocean waves and whose respective upper ends are in air communication with a turbine arrangement such that wave motion occurring at the lower ends is operable to cause air movement within said columns for propelling said turbine arrangement to generate power output, wherein the system further includes one or more position-adjustable and/or angle-adjustable submerged structures near said lower ends of said columns for forming ocean waves propagating in operation towards said lower ends of said columns to couple said waves in a controllable manner into said hollow columns, and wherein said submerged structures are implemented as one or more planar structures provided with an actuator arrangement for displacing and/or tilting said one or more planar structures relative to said array of columns.

16. The ocean wave energy system as claimed in claim 15, wherein said hollow columns are deployed in a non-vertical orientation, and at least a portion of said hollow columns are arranged in operation to exhibit a natural frequency of wave motion therein which is substantially matched to a frequency of ocean waves received at the portion of said hollow columns.

17. The ocean wave energy system as claimed in claim 15, wherein said system includes a sensing arrangement for determining one or more characteristics of ocean waves propagating in operation towards said columns and their associated submerged structures, and a control arrangement for receiving wave-characteristic indicative signals from said sensing arrangement and for processing the signals for regulating positions and/or angles of the submerged structures for providing a dynamically responsive control of the submerged arrangement.

18. The ocean wave energy system as claimed in claim 17, wherein the said control arrangement is implementing using computing hardware implementing at least one of:
(a) controlled adjustment of the submerged arrangement by way of employing a numerical model representative of operating properties of the system; and
(b) use of a neural network whose neural weightings are adapted for controlling operation of the system in response to sensed wave conditions.

19. The ocean wave energy system as claimed in claim 15, wherein said array of hollow columns are disposed with their elongate axes at an oblique angle in a range of 10.degree. to 35.degree. relative to an average level of an upper surface of an ocean environment in which the system is located in operation.

20. The ocean wave energy system as claimed in claim 15, wherein said turbine arrangement includes at least one turbine operable to rotate about a substantially vertical axis in operation for gyroscopically stabilizing said platform when operating in an ocean environment.

21. The ocean wave energy system as claimed in claim 15, wherein said platform is adapted to be rotatable in operation to enable said array of columns to be orientated in respect of ocean waves received at the system.

22. The ocean wave energy system as claimed in claim 15, wherein said system includes aquaculture facilities adapted to be submerged for protection substantially beneath the system in adverse weather conditions which could damage the aquaculture facilities.

23. A method of operating an ocean wave energy system as claimed in claim 15, wherein said method includes:
(a) receiving one or more ocean waves (40) in a vicinity of the one or more submerged structures (300) for adjustably influencing an energy field of the one or more waves (40) to form the one or more waves (40) for being received at an array of air columns (220) of said system (200, 1000, 3000);
(b) receiving said one or more waves at said array of columns for periodically compressing and/or rarefying air in said one or more columns for driving a turbine arrangement for generating power; wherein said submerged structures are implemented as one or more planar structures provided with an actuator arrangement for displacing and/or tilting said one or more planar structures relative to said array of columns.

24. A method of controlling an ocean wave energy system, characterized in that said method includes:
(i) sensing one or more characteristics of ocean waves approaching said ocean wave energy system to generate corresponding sensor signals;
(ii) processing said sensor signals in a processing arrangement to generate corresponding control signals; and
(iii) applying said signals to actuators coupled to one or more position-adjustable and/or angle-adjustable submerged structures near lower ends of columns of said system for forming said sensed ocean waves propagating in operation towards said lower ends of said columns to couple said waves in a controllable manner into said hollow columns for generating corresponding output power.

25. The method of controlling an ocean wave energy system as claimed in claim 24, wherein said processing arrangement is operable to apply a numerical model and/or a neural network for generating said control signals from said sensor signals.

26. The method of controlling an ocean wave energy system as claimed in claim 24, wherein said method includes:
(iv) sensing a propagating direction of ocean waves to be received at the array of columns; and
(v) rotatably orientating said array of columns relative to said propagating direction of said ocean waves.

* * * * *